US012619646B2

(12) United States Patent
Katz et al.

(10) Patent No.: US 12,619,646 B2
(45) Date of Patent: May 5, 2026

(54) AUTOMATING GENERATION OF PERSONA CLASSIFICATION DATA TO CUSTOMIZE INTEGRATION DATA INTO COMPATIBLE DISTRIBUTED DATA SOURCES AT VARIOUS NETWORKED COMPUTING DEVICES

(71) Applicant: Sightly Enterprises, Inc., New York, NY (US)

(72) Inventors: Adam Eric Katz, New York, NY (US); Jacob Maximillian Miesner, New York, NY (US)

(73) Assignee: Sightly Enterprises, Inc., New York, NY (US)

( * ) Notice: Subject to any disclaimer, the term of this patent is extended or adjusted under 35 U.S.C. 154(b) by 0 days.

(21) Appl. No.: 18/824,877

(22) Filed: Sep. 4, 2024

(65) Prior Publication Data

US 2026/0064748 A1      Mar. 5, 2026

Related U.S. Application Data

(63) Continuation-in-part of application No. 18/590,859, filed on Feb. 28, 2024, and a continuation-in-part of
(Continued)

(51) Int. Cl.
G06F 16/335        (2019.01)
G06F 16/583        (2019.01)
G06Q 30/0241       (2023.01)

(52) U.S. Cl.
CPC .......... *G06F 16/337* (2019.01); *G06F 16/583* (2019.01); *G06Q 30/0276* (2013.01)

(58) Field of Classification Search
CPC .. G06F 16/337; G06F 16/583; G06Q 30/0276
See application file for complete search history.

(56) References Cited

U.S. PATENT DOCUMENTS 7,912,868 B2 *   3/2011   Calistri-Yeh ........... G06Q 30/02
                                                    704/9
8,566,292 B2 *  10/2013   Primm ................ G06F 11/3065
                                                    707/694
(Continued)

OTHER PUBLICATIONS

U.S. Appl. No. 17/314,630, filed May 7, 2021, Adam Eric Katz.
(Continued)

*Primary Examiner* — Angelica Ruiz
(74) *Attorney, Agent, or Firm* — KOKKA & BACKUS, PC

(57) ABSTRACT

Various embodiments relate generally to data science and data analysis, computer software and systems, and control systems to provide a platform to facilitate updating compatible distributed data files, among other things, and, more specifically, to a computing and data platform that implements logic to facilitate correlation of event data via analysis of electronic messages, including executable instructions and content, etc., via a cross-stream data processor application configured to, for example, update or modify one or more compatible distributed data files automatically. Further, a computing platform is configured to receive inputs as natural language to facilitate automatic generation and integration to form a modified distributed file responsive to events, or moments, among other things including data relevant to an entity, which may provide a good or service.

18 Claims, 25 Drawing Sheets

Related U.S. Application Data application No. 18/590,863, filed on Feb. 28, 2024, and a continuation-in-part of application No. 17/314, 643, filed on May 7, 2021, now Pat. No. 12,111,815.

(56)                References Cited

U.S. PATENT DOCUMENTS

| | | | |
|---|---|---|---|
| 11,698,919 | B2 | 7/2023 | Katz et al. |
| 11,700,218 | B2 | 7/2023 | Katz et al. |
| 12,111,815 | B2 | 10/2024 | Katz et al. |
| 2011/0060745 | A1* | 3/2011 | Hoffman ........... G06F 16/24557 |
| | | | 707/748 |
| 2018/0322170 | A1 | 11/2018 | Alberton et al. |
| 2019/0362317 | A1 | 11/2019 | Rogynskyy et al. |
| 2020/0250249 | A1 | 8/2020 | Fedoryszak et al. |
| 2020/0302919 | A1 | 9/2020 | Greborio et al. |
| 2021/0157858 | A1 | 5/2021 | Stevens et al. |
| 2022/0138489 | A1 | 5/2022 | Ye et al. |
| 2022/0358114 | A1 | 11/2022 | Katz et al. |
| 2022/0358115 | A1 | 11/2022 | Katz et al. |
| 2022/0358147 | A1 | 11/2022 | Katz et al. |
| 2024/0046318 | A1* | 2/2024 | Muriqi ............... G06Q 30/0273 |
| 2024/0249080 | A1* | 7/2024 | Sun .......................... G06F 40/40 |
| 2024/0249318 | A1* | 7/2024 | Spiegel ................... H04L 51/02 |
| 2024/0256592 | A1* | 8/2024 | O'Neill ................. G06F 16/435 |
| 2024/0267344 | A1* | 8/2024 | Mulligan .............. H04L 51/214 |
| 2024/0303473 | A1* | 9/2024 | Cheng .................... G06N 3/045 |
| 2024/0419830 | A1* | 12/2024 | Park .................... G06F 21/6254 |

OTHER PUBLICATIONS

U.S. Appl. No. 17/314,646, filed May 7, 2021, Adam Eric Katz.

Bromell, Alexandria Y., Non-Final Office Action mailed Dec. 12, 2022 for U.S. Appl. No. 17/314,646.

Joseph, Seb, 'Media responsibility is now corporate social responsibility': Marketers reassess brand safety controls to navigate a divided America, Brands in Culture, Digiday, Published Jan. 20, 2021, URL: https://digiday.com/?p=388931.

Kim, Taelor, Final Office Action mailed Dec. 7, 2023 for U.S. Appl. No. 17/314,643.

Kim, Taelor, Final Office Action mailed Nov. 8, 2022 for U.S. Appl. No. 17/314,643.

Kim, Taelor, Non-Final Office Action mailed Jun. 23, 2022 for U.S. Appl. No. 17/314,643.

Kim, Taelor, Notice of Allowance and Fee(s) Due mailed Jul. 19, 2024 for U.S. Appl. No. 17/314,643.

Southern, Lucinda, Blocklists Are 'Surgery With a Guillotine,' So Dow Jones Built a Brand Safety Tool, Digital Transformation, AdWeek, Published Oct. 30, 2020, URL: https://www.adweek.com/media/dow-jones-brand-safety-tool-triples-ad-inventory/.

* cited by examiner

400

700

701

Cross-Stream Data Processor Layer
750

Application Layer
740

| Multi-Stream Event Correlator Layer 724 | Attribute Characterizer Engine Layer 726 |
| --- | --- |
| Diffusivity Index Controller Layer 720 | Data Compatibility Controller Layer 722 |

Messaging Layer
(e.g., Publish-Subscribe Layer)
710

Data Exchange Layer
(e.g., JSON, XML, etc.)
703d

Service Layer
(e.g., REST API)
703c

Transport
(e.g., HTTP)
703b

Network
(e.g., TCP/IP)
703a

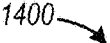

1400

```
┌──────────┐   ┌──────────┐   ┌──────────┐
│Computing │   │ Mobile   │   │Wearable  │
│ Device   │   │Computing │   │Computing │
│          │   │ Device   │   │ Device   │
│  1405    │   │  1406    │   │  1407    │
└────┬─────┘   └────┬─────┘   └────┬─────┘
```

Network(s)
1410

Server
1415

Cross-Stream Data
Processor
Application

1450

Data Store
1416

```
┌──────────┐ ┌──────────┐ ┌──────────┐ ┌──────────┐   ┌──────────┐
│   Web    │ │Electronic│ │Electronic│ │ Social   │   │          │
│Application│ │  Mail    │ │Messaging │ │Networking│   │Directory │
│          │ │Application│ │Application│ │ Services │   │Services  │
│  1424    │ │  1426    │ │  1428    │ │  1430    │   │  1432    │
└──────────┘ └──────────┘ └──────────┘ └──────────┘   └──────────┘
```

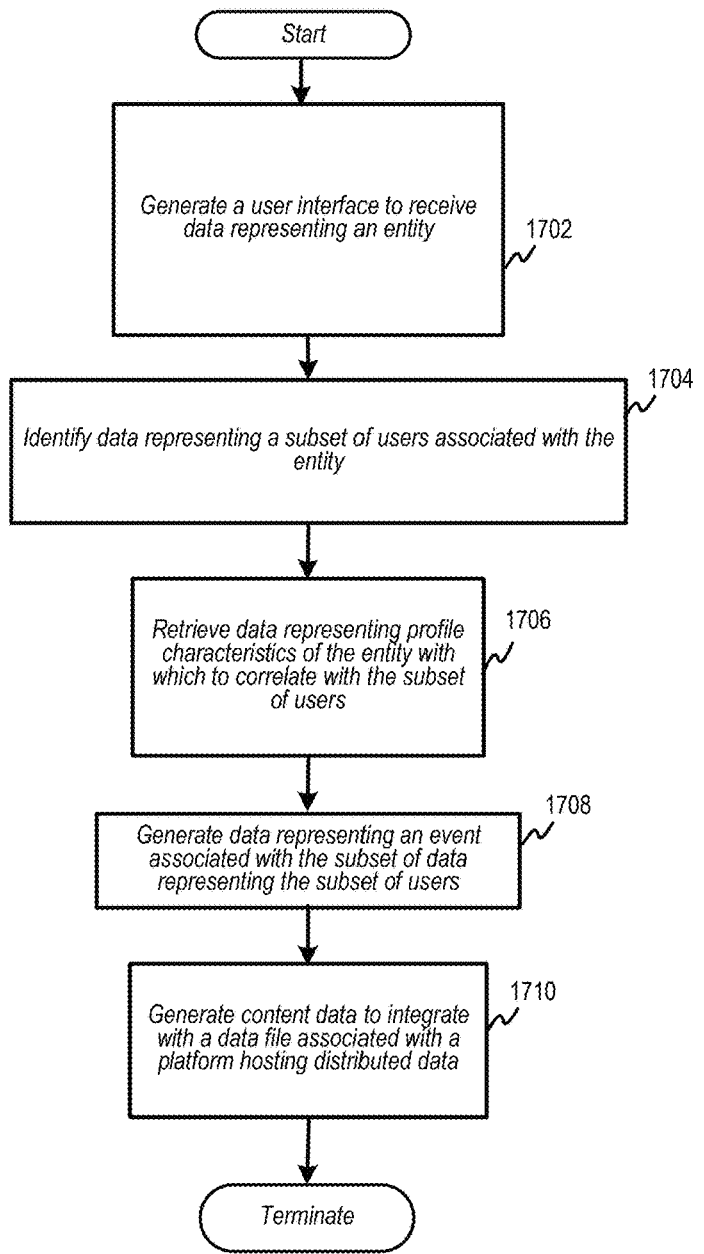

Start

Generate a user interface to receive data representing an entity 1702

Identify data representing a subset of users associated with the entity 1704

Retrieve data representing profile characteristics of the entity with which to correlate with the subset of users 1706

Generate data representing an event associated with the subset of data representing the subset of users 1708

Generate content data to integrate with a data file associated with a platform hosting distributed data 1710

Terminate

Persona
Data
*1810*

Entity
Data
*1812*

Entity
Communication
Link Data
*1814*

Entity Profile
Data
*1816*

Platform
Selection Data
*1818*

Entity
Communication
Data
*1815*

Context
Data
Generator
*1820*

Persona
Generator
*1830*

Persona
Descriptive
Generator
*1832*

Persona
Characterization
Engine
*1836*

Persona
Image
Generator
*1834*

Vector
Database
*1840*

Persona
Parameters
*1842*

Large
Language
Model
("LLM")
*1844*

Persona
Data Output
*1850*

1900

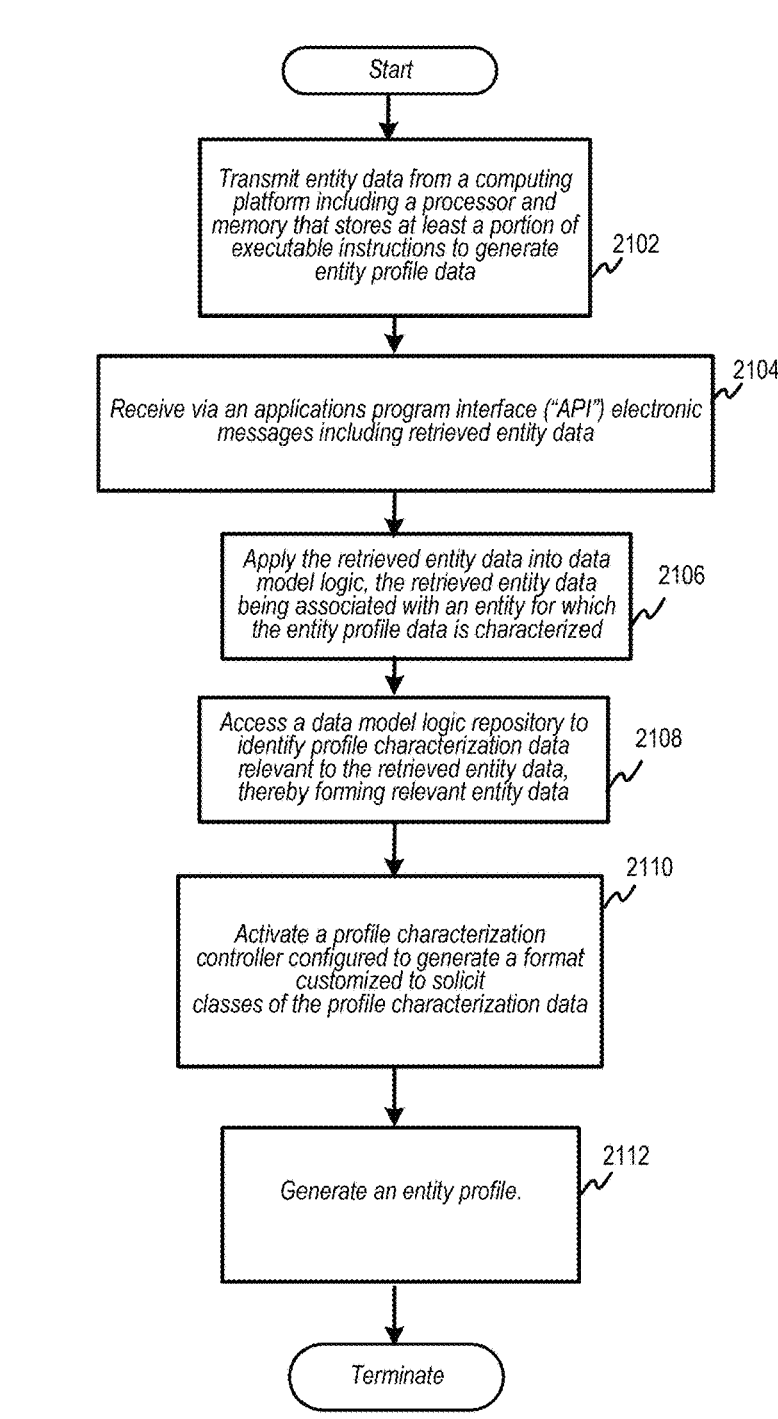

2100

Start

Transmit entity data from a computing platform including a processor and memory that stores at least a portion of executable instructions to generate entity profile data          2102

Receive via an applications program interface ("API") electronic messages including retrieved entity data          2104

Apply the retrieved entity data into data model logic, the retrieved entity data being associated with an entity for which the entity profile data is characterized          2106

Access a data model logic repository to identify profile characterization data relevant to the retrieved entity data, thereby forming relevant entity data          2108

Activate a profile characterization controller configured to generate a format customized to solicit classes of the profile characterization data          2110

Generate an entity profile.          2112

Terminate

FIG. 21

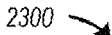
2300
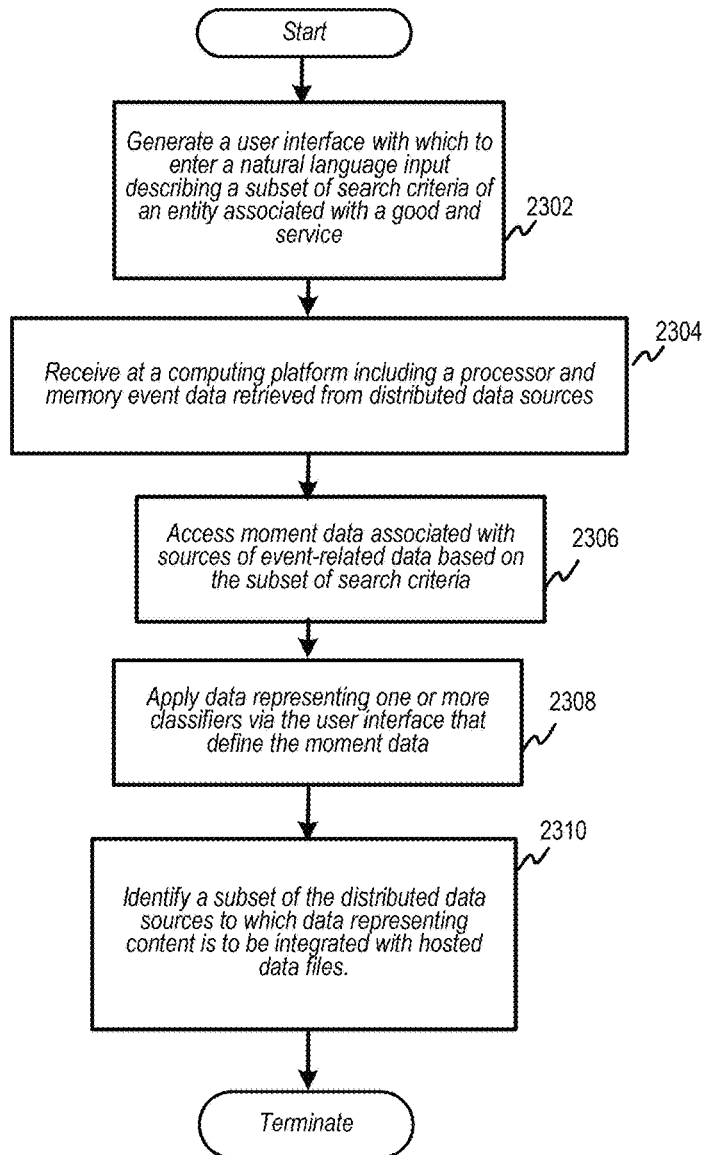
FIG. 23

2500

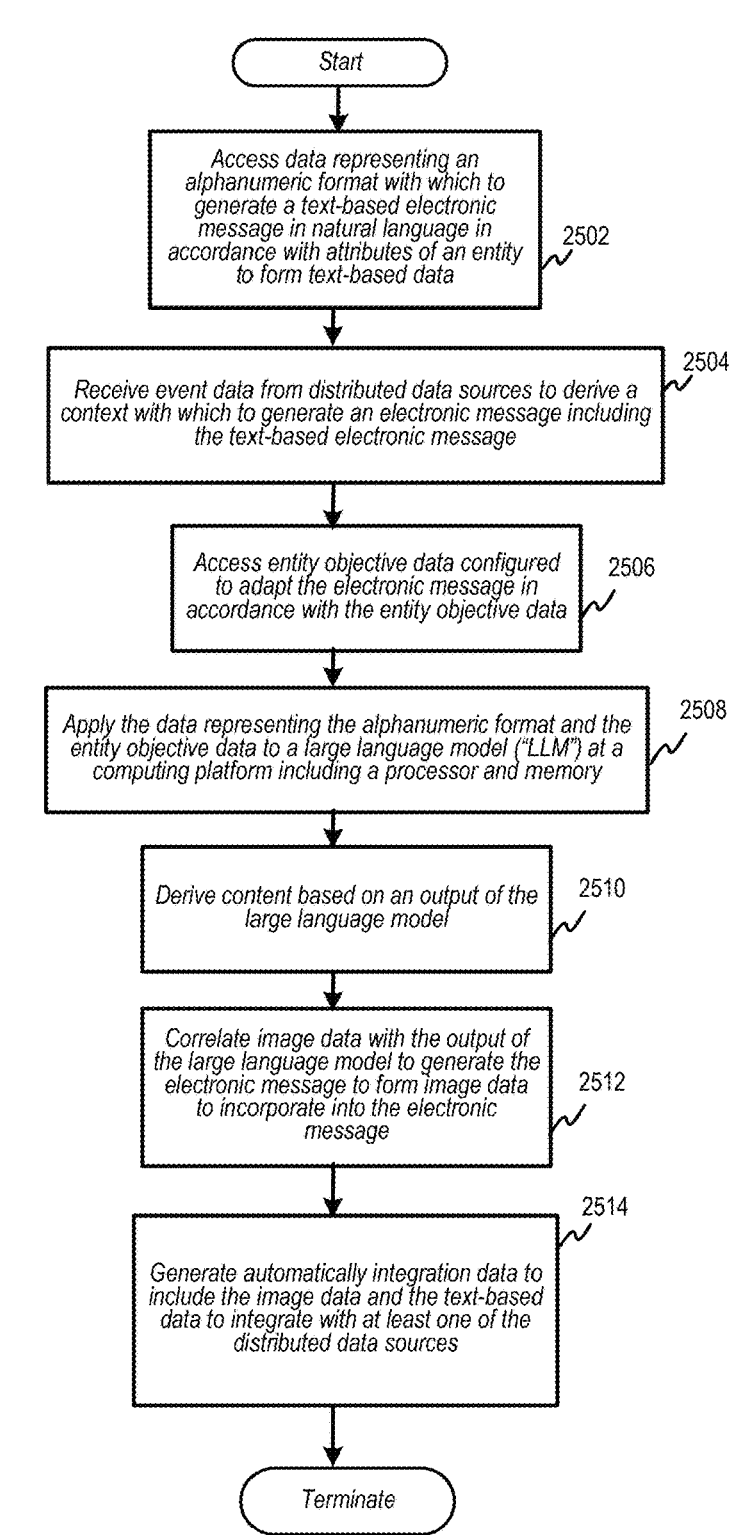

Start

Access data representing an alphanumeric format with which to generate a text-based electronic message in natural language in accordance with attributes of an entity to form text-based data    2502

Receive event data from distributed data sources to derive a context with which to generate an electronic message including the text-based electronic message    2504

Access entity objective data configured to adapt the electronic message in accordance with the entity objective data    2506

Apply the data representing the alphanumeric format and the entity objective data to a large language model ("LLM") at a computing platform including a processor and memory    2508

Derive content based on an output of the large language model    2510

Correlate image data with the output of the large language model to generate the electronic message to form image data to incorporate into the electronic message    2512

Generate automatically integration data to include the image data and the text-based data to integrate with at least one of the distributed data sources    2514

Terminate

FIG. 25

AUTOMATING GENERATION OF PERSONA CLASSIFICATION DATA TO CUSTOMIZE INTEGRATION DATA INTO COMPATIBLE DISTRIBUTED DATA SOURCES AT VARIOUS NETWORKED COMPUTING DEVICES

CROSS-REFERENCE TO APPLICATIONS

This nonprovisional application is a continuation-in-part ("CIP") application of co-pending U.S. patent application Ser. No. 17/314,643 filed May 7, 2021 and entitled "CORRELATING EVENT DATA ACROSS MULTIPLE DATA STREAMS TO IDENTIFY COMPATIBLE DISTRIBUTED DATA FILES WITH WHICH TO INTEGRATE DATA AT VARIOUS NETWORKED COMPUTING DEVICES;" this nonprovisional application is a continuation-in-part ("CIP") application of co-pending U.S. patent application Ser. No. 18/590,859 filed Feb. 28, 2024 and entitled "UPDATING COMPATIBLE DISTRIBUTED DATA FILES ACROSS MULTIPLE DATA STREAMS OF AN ELECTRONIC MESSAGING SERVICE ASSOCIATED WITH VARIOUS NETWORKED COMPUTING DEVICES;" this nonprovisional application is a continuation-in-part ("CIP") application of co-pending U.S. patent application Ser. No. 18/590,863 filed Feb. 28, 2024 entitled "AGGREGATING DATA TO FORM GENERALIZED PROFILES BASED ON ARCHIVED EVENT DATA AND COMPATIBLE DISTRIBUTED DATA FILES WITH WHICH TO INTEGRATE DATA ACROSS MULTIPLE DATA STREAMS." all of which are herein incorporated by reference in their entirety for all purposes.

FIELD

Various embodiments relate generally to data science and data analysis, computer software and systems, and control systems to provide a platform to facilitate updating compatible distributed data files, among other things, and, more specifically, to a computing and data platform that implements logic to facilitate correlation of event data via analysis of electronic messages, including executable instructions and content, etc., via a cross-stream data processor application configured to, for example, update or modify one or more compatible distributed data files automatically. Further, a computing platform is configured to receive inputs as natural language to facilitate automatic generation and integration to form a modified distributed file responsive to events, or moments, among other things including data relevant to an entity, which may provide a good or service.

BACKGROUND

Advances in computing hardware and software have fueled exponential growth in delivery of vast amounts of information due to increased improvements in computational and networking technologies. Also, advances in conventional data network technologies provide an ability to exchange increasing amounts of generated data via various electronic messaging platforms. Thus, improvements in computing hardware, software, network services, and storage have bolstered growth of Internet-based messaging applications, such as social networking platforms and applications, especially in a technological area aimed at exchanging digital information concerning products and services expeditiously. As an example, various organizations and corporations (e.g., retailer sellers) may exchange information through any number of electronic messaging networks, including social media networks (e.g., Twitter®, or X®, and Reddit™), as well as user-generated content (e.g., YouTube®) and news-related web sites. Such entities aim to provide time-relevant data and content to users online to manage brand loyalty and reputation, and to enhance customer engagement.

And since different audiences and users prefer consuming content over different communication channels and various different data networks, traditional implementations of computing systems and computer-implemented processes have various drawbacks. Hence, traditional approaches are not well-suited to update distributed data files to optimize engagement with customers and potential customers in ever-increasingly dynamic computing environments. For example, traditional computing architectures typically require executable code to be deployed and maintained on a server, whereby some conventional server architectures hinder scalability. Known server architectures also may be single threaded. Examples of single threaded servers include conventional database servers, such as SQL servers (e.g., a PostgreSQL server). As a result, calls to application programming interfaces ("APIs") are processed sequentially, which further hinders scalability. Consequently, traditional server architectures and processes are not well-suited to update distributed data files and content in real-time (or near real-time).

Further, general techniques of updating distributed files, including those hosted by data sources, such as those platforms hosting social media application, typically are agnostic to aims of optimizing connecting with classifications of users associated with an entity delivering a good or service (e.g., a brand), especially in a dynamic environment (e.g., temporal events that affect an entity, such as a reputation of the entity).

Thus, what is needed is a solution for facilitating techniques that optimize computer utilization and performance associated with updating data files and content via an electronic messaging service in association with an entity and its goods or services in a dynamic environment, without the limitations of conventional techniques.

BRIEF DESCRIPTION OF THE DRAWINGS

Various embodiments or examples ("examples") of the invention are disclosed in the following detailed description and the accompanying drawings:

FIG. 7 illustrates an exemplary layered architecture for implementing a cross-stream data processor application, according to some examples;

FIG. 14 depicts an example of a system architecture to provide a computing platform to host an application to analyze electronic messages including data associated with distributed data files in a distributed computing system, according to an example;

FIG. 17 is a diagram depicting an example of a flow to autonomously generate integration data for integration into a distributed data source, according to some examples;

FIG. 21 is a diagram depicting an example of a flow to autonomously generate brand profile data with which to generate a set of data describing aspects of a good or service, according to some examples;

FIG. 23 is a diagram depicting an example of a flow to classify distributed data sources compatible with a good or service, according to some examples;

FIG. 25 is a diagram depicting an example of a flow to generate integration data promoting a good or a service compatible with distributed data sources, according to some examples.

DETAILED DESCRIPTION

Figure 1:
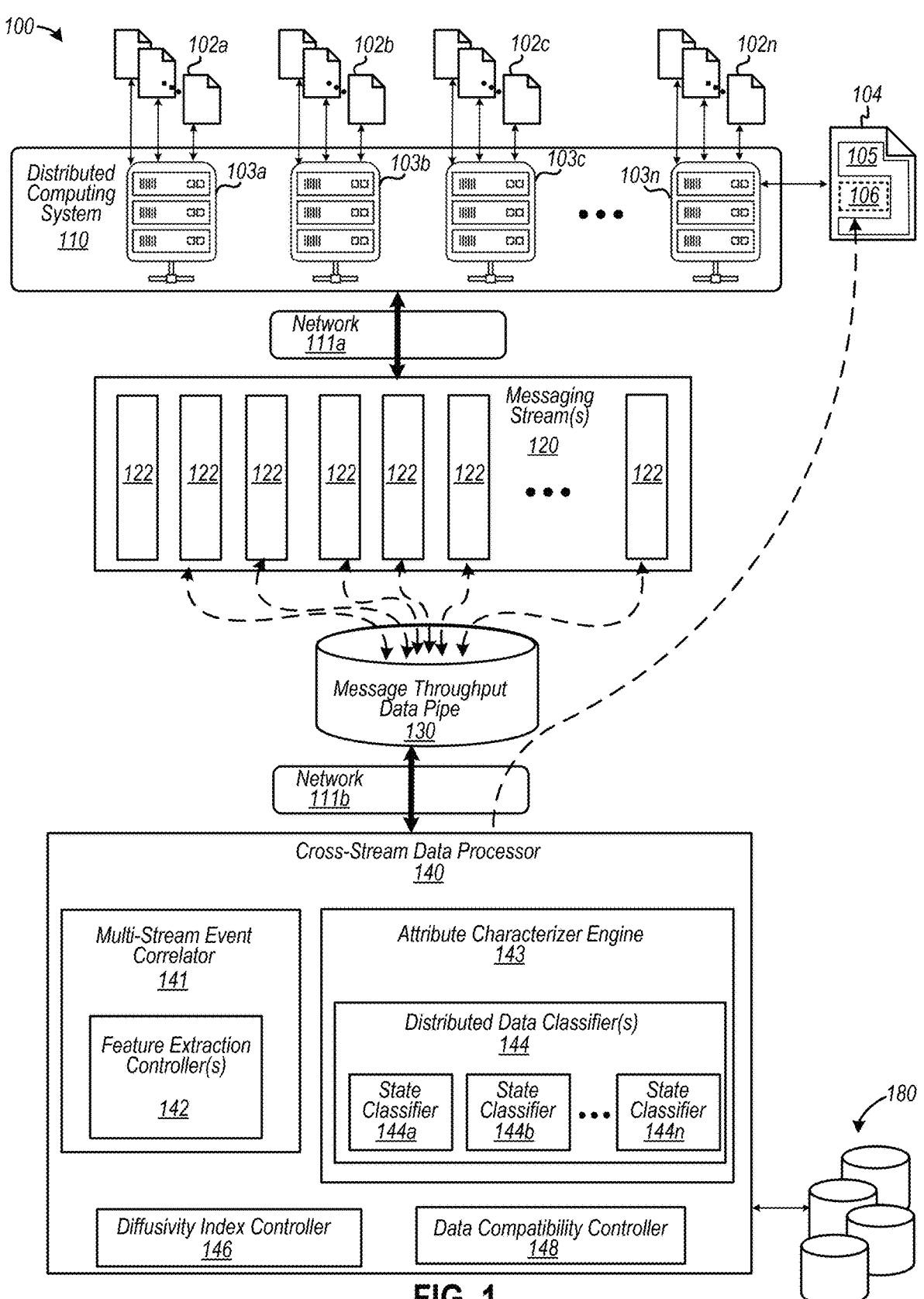
FIG. 1 is a diagram depicting a cross-stream data processor configured to automatically update or modify one or more compatible distributed data files, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, etc.

Also applicable are computer programming languages and formats similar or equivalent to those developed by data facility and computing providers such as Amazon® Web Services, Inc. of Seattle, Washington, FMP, Oracle®, Sales-force.com, Inc., or others, without limitation or restriction to any particular instance or implementation. DynamoDB™, Amazon Elasticsearch Service, Amazon Kinesis Data Streams ("KIDS")™, Amazon Kinesis Data Analytics, and the like, are examples of suitable technologies provide by Amazon Web Services ("AWS"). Another example of cloud computing services may include the Google® cloud platform that may implement a publisher-subscriber messaging service (e.g., Google® pub/sub architecture).

Further, references to databases, data structures, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR")), or others, without limitation, for use on social networks, social media, and social applications (e.g., "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction. In various embodiments, the term "content" may refer to, for example, one or more of executable instructions (e.g., of an application, a program, or any other code compatible with a programming language), textual data, video data, audio data, or any other data.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™ XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, Exit's, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

The described techniques may be implemented as a software-based application, platform, or schema. In some examples, machine or deep learning algorithms such as those used in computing fields associated with "artificial intelligence" may be used. While there is no particular dependency to a given type of algorithm (e.g., machine learning, deep learning, neural networks, intelligent agents, or any other type of algorithm that, through the use of computing machines, attempts to simulate or mimic certain attributes of natural intelligence such as cognitive problem solving, without limitation or restriction), there is likewise no requirement that only a single instance or type of a given algorithm be used in the descriptions that follow.

Various approaches may implement machine learning neural networks, deep learning neural networks, artificial neural networks, convolution neural networks, recursive neural networks ("RAN"), long short-term memory ("LSTM"), and the like, and any of which may implement natural language processing ("NLP") and/or natural language model. Further, various examples described herein may implement generative artificial intelligence with natural language, generative pre-trained transformers ("GOT")™, large language models ("LLM"), and the like. Also, agent programs that accept and transmits data in natural language, such as a natural language chatbot, may be used to interoperate with the above-described approaches, including ChatGPT™ of OpenAI™ of San Francisco, CA, as well as others.

In some examples, systems, software, platforms, and computing clouds, or any combination thereof, may be implemented to facilitate online distribution of subsets of units of content, postings, electronic messages, and the like. In some cases, units of content, electronic postings, electronic messages, and the like may originate at social networks, social media, and social applications, or any other source of content as a function of machine learning or deep learning implement neural networks, such as an LLM.

FIG. 1 is a diagram depicting a cross-stream data processor configured to automatically update or modify one or more compatible distributed data files, according to some embodiments. Diagram 100 depicts an example of a cross-stream data processor 140 configured to extract data from (or associated with) data files 102a to 102n, which may be generated and hosted at distributed data sources 103a to 103n, respectively, of a distributed computing system 110. Extracted data, such as feature data, may be received from any number of distributed data sources 103a to 103n into cross-stream data processor 140 via one or more networks 111a and 111b and a message throughput data pipe 130. As shown, cross-stream data processor 140 may be configured to receive electronic message data across any number of data streams 122 of messaging streams 120, and further configured to analyze electronic message data to detect patterns of data. Cross-stream data processor 140 also may be configured to correlate patterns of data over multiple data streams 122 to identify event data constituting one or more "events." Data associated with data files 102a to 102n may be classified to determine compatibility of integrating updated or modified executable instructions and content data in one or more compatible data files 102a to 102n. As shown, cross-stream data processor 140 may be configured to determine data file 104 includes data 105 that may be compatible with integration data 106, which may be configured to integrate data to modify distributed data file 104. Thus, modified data file 104 may be configured to function or behave differently upon receiving integration data 106.

In various examples, message throughput data pipe 130 implements an asynchronous messaging service that may be configured to scale data throughput to sufficiently extract feature data and identify events (and event data) in real-time (or near real-time) over large amounts of data. Thus, message throughput data pipe 130 may facilitate expeditious identification of compatible data files 102a to 102n with which to integrate executable instructions and/or content data 106 responsive to detection of an event. In some examples, cross-stream data processor 140 may be configured to determine prevalence and influence (e.g., functional influence) of event data across multiple data sources for purposes of identifying data files 102a to 102n that may be configured to automatically accept integration data 106. In some cases, prevalence and influence of event data across multiple data sources 103a to 103n may be computed based on a rate of diffusivity of event-related data in each data source 103 and across a number of data files 102a to 102n.

In at least one example, distributed data sources 103a to 103n may include repositories of executable instructions, such as GitHub™, Inc., or any other data repository (e.g., repositories of APIs). In some examples, distributed data sources 103a to 103n may be configured to render user-generated content, such as audio or video deployed on YouTube®-based computing platforms or Spotify®-based computing platforms. Also, distributed data sources 103a to 103n may be configured to implement social networks, social media, and social applications (e.g., "social media") such as Twitter®, or X™, of San Francisco, California, Reddit® of San Francisco, California, Snapchat® as developed by Snap® of Venice, California, Messenger services as developed by Facebook®, WhatsApp®, or Instagram® of Menlo Park, California, Pinterest® of San Francisco, California, LinkedIn® of Mountain View, California, and others, without limitation or restriction. Also, distributed data sources 103a to 103n may be configured to generate and host any other type of digital content, such as email, text messaging (e.g., via SMS messaging, Multimedia Messaging Service ("MMS"), WhatsApp™, WeChat™, Apple® Business Chat™, Instagram™ Direct Messenger, etc.), and web pages (e.g., news websites, retailer websites, etc.). Additionally, distributed data sources 103a to 103n may be configured to generate and host content data, such as a "smart TV" data (e.g., a television or display with an internet connection and media platform), or data generated by a connected media device (e.g., an OTT, or "over the top" device), such as devices that interface with a TV or media player and is connected to the internet, which enables applications and video streaming. Examples of OTT devices include Amazon Fire Stick®, Apple TV, Roku®, and the like. Distributed data sources 103a to 103n may also include gaming consoles, such as Nintendo® Switch, Xbox®, Sony PlayStation®, among others.

Diagram 100 depicts cross-stream data processor 140 including a multi-stream event correlator 141, an event attribute characterizer engine 143, a diffusivity index controller 146, and a data compatibility ability controller 148. Multi-stream event correlator 141 may be configured to identify event data for correlating with other similar event data across any number of distributed data files 102a to 102n. As shown, multi-stream event correlator 141 may include one or more feature extraction controllers 142 each of which may be configured to identify and extract feature data (e.g., units of data) to detect patterns of data that may be used to constitute an event. In some examples, feature data may include units of text (e.g., words or tokens), units of image data (e.g., an amount of pixels, or matched image data), units of audio data, and the like. Diffusivity index controller 146 may be configured to compute a value representing a rate of diffusivity of event data based on detected features and supplemental data, which may include metadata. Once cross-stream data processor 140 identifies event data associated with a subset of distributed data files 102a to 102n, attribute characterizer engine 143 may be configured to characterize attribute data in distributed data files 102a to 102n to determine a degree of compatibility of a target data file 104 for accepting integration data 106. Distributed data classifiers 144 may include one or more state classifiers 144a to 144n, each being configured to characterize one or more types of state and state values associated with content 105 to determine compatibility of data file 104. Data compatibility controller 148 may be configured to filter state data, as computed by state classifiers 144a to 144n, in accordance with compatibility rule data to determine whether a distributed data file is compatible. Compatibility rule data may be stored in repository 180. In some examples, repository 180 also includes various subsets of data to be integrated into distributed data files of data sources based on whether a subset of data to be integrated into specific data source is compatible with the content of that data source.

In view of the foregoing, structures and/or functionalities depicted in FIG. 1 as well as other figures herein, may be implemented as software, applications, executable code, application programming interfaces ("APIs"), processors, hardware, firmware, circuitry, or any combination thereof.

Figure 2:
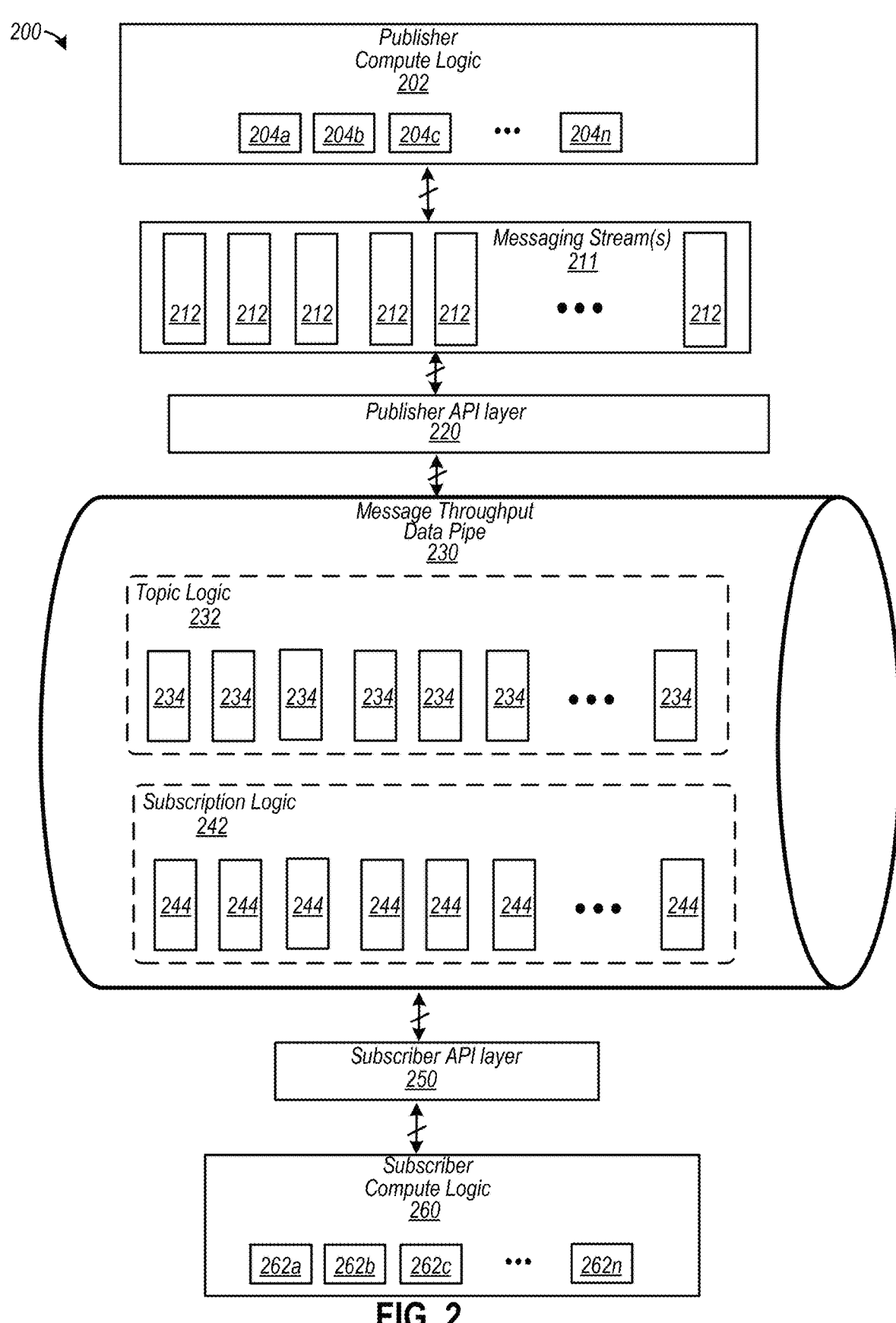
FIG. 2 depicts an example of a messaging service, according to some examples.

FIG. 2 depicts an example of a messaging service, according to some examples. Diagram 200 depicts a messaging service architecture including publisher compute logic 202 to publish electronic messages via data streams 212 of messaging streams 211. In some examples, publisher compute logic 202 may include any number of publisher processes ("publishers") 204a to 204n to communicate with any number of distributed data sources and distributed computing devices (not shown). In various examples, publisher compute logic 202 may be disposed at distributed computing systems, at a publisher API layer 220, or at anywhere among networked computing systems and storage.

As shown, publisher processes 204a to 204n may be coupled via publisher application programming interface ("API") layer 220, which may include one or more publisher APIs, to topic logic 232 of a message throughput data pipe 230. In some examples, one or more topic processes ("topics") 234 of topic logic 232 may be linked to communication logic that may correspond with a data stream 212 in messaging streams 211. In at least one case, a topic may be referred to as a named entity that represents a feed of messages (e.g., a data stream 212). Further, message throughput data pipe 230 may also include subscription processes ("subscriptions") 244 of subscription logic 242. Subscriptions 244 may be configured to receive messages from a subscribed topic 234 for conveying via one or more APIs in subscriber API layer 250 to a number of subscriber processes ("subscribers") 262a to 262n. According to some examples, APIs in publisher API layer 220 and subscriber API layer 250 may be implemented as REST APIs, RPC APIs, or any other suitable format or protocol.

Publishers 204a to 204n and subscribers 262a to 262n may include hardware (e.g., processors and memory), software, or a combination thereof, and may be configured to exchange data with one or more computing devices to facilitate operation of a cross-stream data processor, according to some examples. According to various examples, messaging service architecture of diagram 200 may be configured to provide daily throughput volume of more than 28 million API units (e.g., more than 14 million channels in 24 hours), whereby an API unit may include text of a document with less than (or equal to) 1,000 Unicode characters. In some examples, publishers 204a to 204n each may be implemented to provide a throughput of 12,000,000 kB per minute (e.g., 200 MB/s), or greater, and subscribers 262a to 262n each may be implemented to provide a throughput of 24,000,000 kB per minute (e.g., 400 MB/s), or greater.

According to at least some embodiments, the above-described elements of a messaging service may be implemented in accordance with an architecture and/or framework similar to, or consistent with, a publish-subscribe messaging service architecture provided by Google® as Google Cloud Pub/Sub, which is developed by Google of Mountain View, California. In some cases, messaging service architecture of diagram 200 may also implement an Apache® Kafka™ messaging system, which is maintained by the Apache Software Foundation, at www(.)Apache(.)org, or a variant thereof.

Note that elements depicted in diagram 200 of FIG. 2 may include structures and/or functions as similarly-named or similarly-numbered elements depicted in other drawings.

Figure 3:
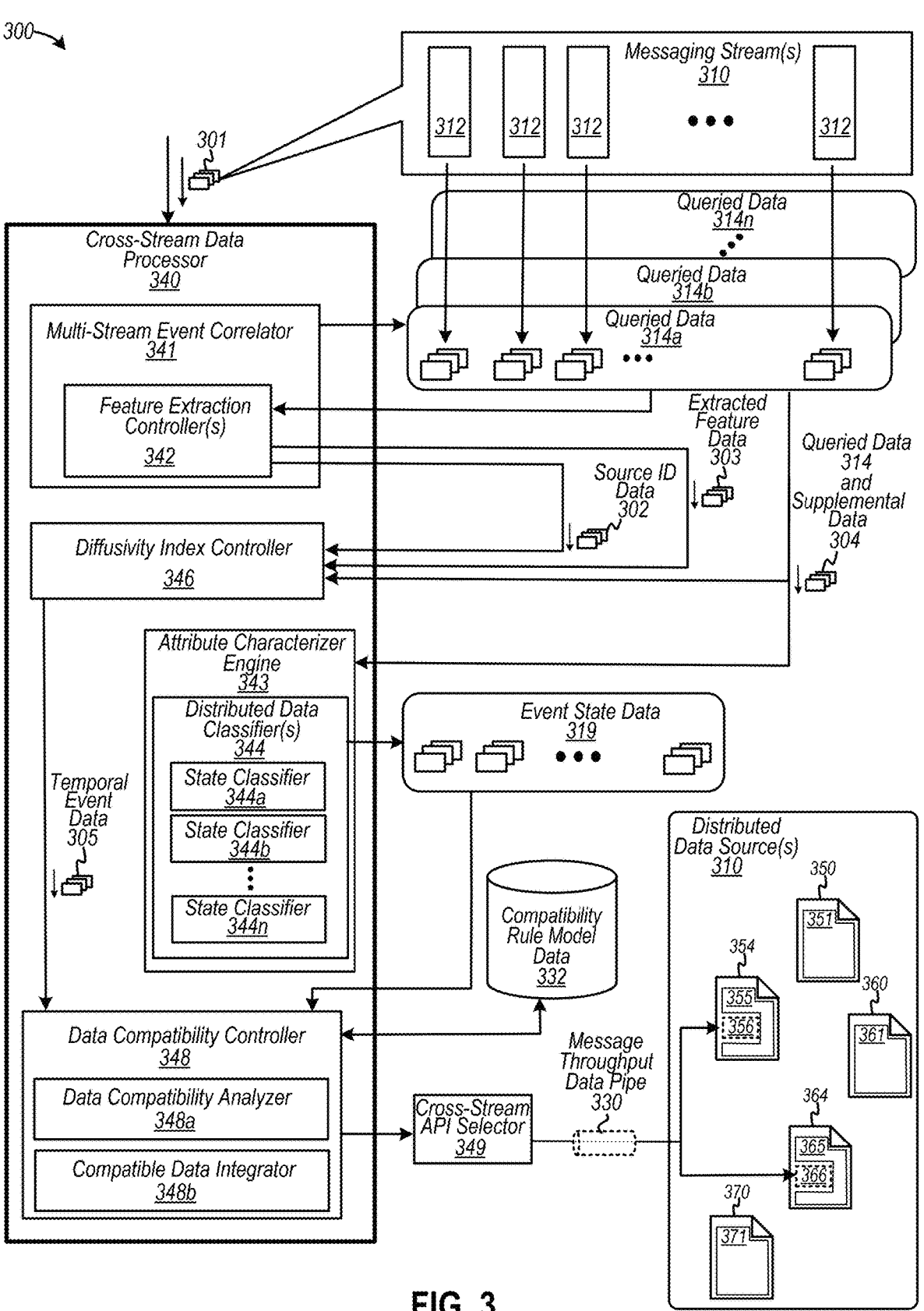
FIG. 3 is a diagram depicting a functional block diagram of a cross-stream data processor, according to some examples.

FIG. 3 is a diagram depicting a functional block diagram of a cross-stream data processor, according to some examples. Diagram 300 depicts another example of a cross-stream data processor 340, which includes a multi-stream event correlator 341, which is shown to include feature extraction controllers 342, a diffusivity index controller 346, an attribute characterizer engine 343, which is shown to include state classifiers 344a to 344n of a distributed data classifier 344, and a data compatibility controller 348. Note that elements depicted in diagram 300 of FIG. 3 may include structures and/or functions as similarly-named or similarly-numbered elements depicted in other drawings.

In operation, cross-stream data processor 340 may be configured to receive data 301 as multiple data streams or data channels of message stream 310. In some embodiments, data 301 may be temporarily stored in memory (e.g., cloud storage) and queried in batches. Data 301 may be transient in some examples and need not be stored. As shown, queried data 314a to 314n may represent batches of data queried at different ranges of time to extract features and determine event data (e.g., for an interval of time). In the example shown, feature extraction controllers 342 may be configured to generate extracted feature data 303, such as text or tokenized characters, that may be associated with corresponding source identifier ("ID") data 302 to identify one or more specific data sources from which extracted feature data 303 is determined. Note that a subset of event data may be associated with multiple source identifiers, thereby indicating multiple target data files for integrating data in accordance with various examples. Extracted feature data 303 and source ID data 302 may be provided to diffusivity index controller 346, along with queried data (e.g., data from a data source) and supplemental data 304. In some cases, either queried data 314 or supplemental data 304, or both, may optionally be passed to diffusivity index controller 346. Supplemental data 304 may include data identified as metadata that is generated by a data source, an API, or other code or executable instructions. As shown, diffusivity index controller 346 may be configured to identify diffusive data representing propagation of event-related data among various computing platforms, and may be further configured to generate temporal event data 305. Temporal event data 305 may identify event data of particular interest across multiple data streams 312 (and across associated distributed data sources) for a particular range of time.

Attribute characterizer engine 343 may be configured to receive one or more of data 302, data 303 and data 304 to characterize data files at distributed data sources. For example, distributed data files including code or executable instructions may be characterized as being of a type of a programming language (e.g., JavaScript), as having a certain functionality for which code or executable instructions may be implemented, or having any other attribute or value of attribute associated with distributed data files. In other examples, distributed data files may include text data, image data, audio data, etc., whereby each distributed data file may be characterized to determine one or more classifications of text, image, or audio attributes. In some cases, text of an electronic document or data file may be classified in accordance with a "topic" attribute (or any other attribute), as well as other feature data including image data and audio data, to identify event data. Each of state classifiers 344a to 344n may be configured to generate data representing characterized attribute data, such as event state data 319, which may be transmitted to data compatibility controller 348.

Data compatibility controller 348 is shown to include a data compatibility analyzer 348a and a compatible data integrator 348b. Data compatibility analyzer 348a may include logic configured to receive temporal event data 305 and event state data 319, and the logic may be further configured to access compatibility rule model data 332. Compatibility rule model data 332 may include data and rules with which data compatibility analyzer 348a can analyze event state data 319 associated with distributed data files to determine compatible data with which to integrate one or more subsets of data in distributed data sources 103 of FIG. 1. Compatible data integrator 348b may be configured to identify distributed data files 354 and 364 that may include compatible data 355 and 365, respectively, responsive to data signals from data compatibility analyzer 348a specifying compatible data. Further to this example, compatible data integrator 348b may identify content 351, 361, and 371 of respective data files 350, 360, and 370 as including incompatible executable instructions and/or content. In some examples, compatible data integrator 348b may be configured to identify APIs through which, or with which, integration data 356 and 366 may be guided through a cross-stream API selector 349 to transmit integration data 356 and 366 via a message throughput data pipe 330 for integration with compatible data 355 and 366, respectively.

In view of the foregoing, structures and/or functionalities depicted in FIG. 3 as well as other figures herein, may be implemented as software, applications, executable code, application programming interfaces ("APIs"), processors, hardware, firmware, circuitry, or any combination thereof.

Figure 4:
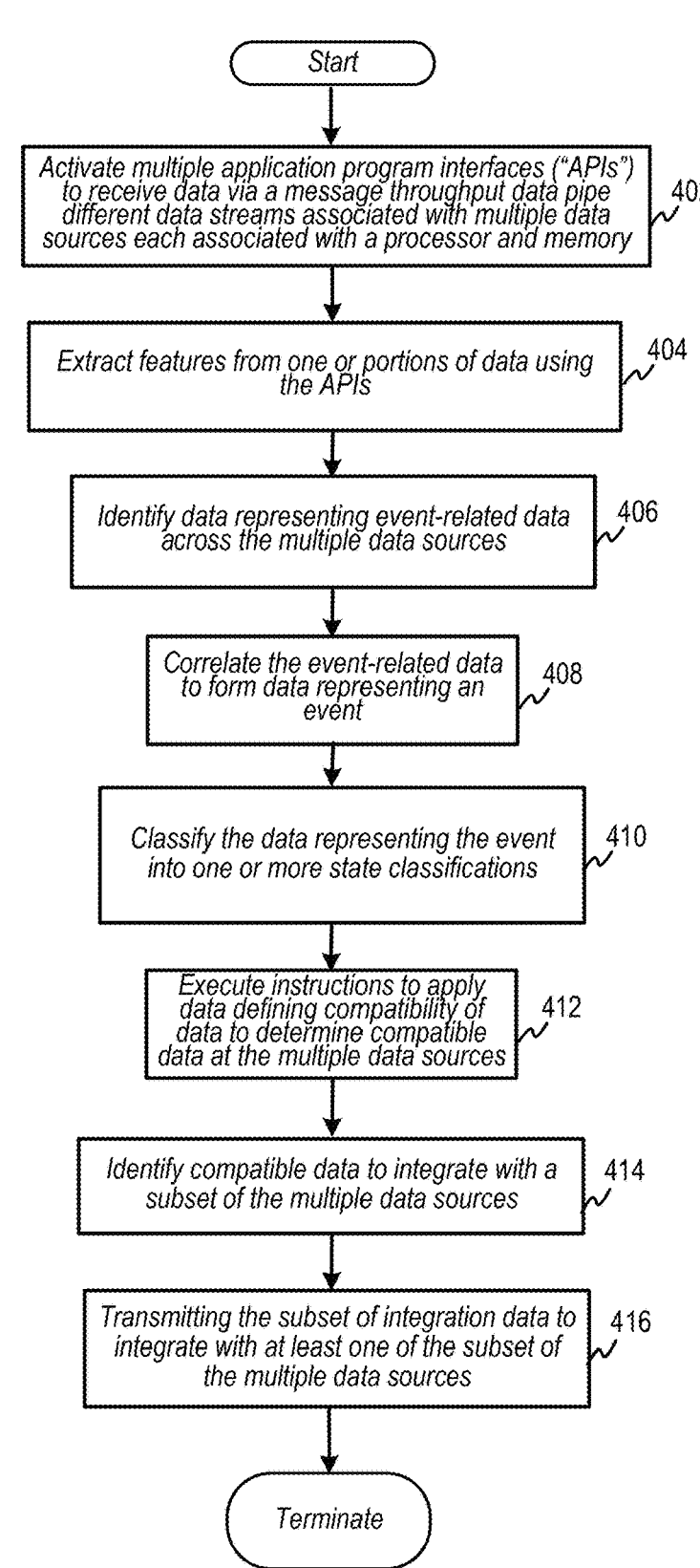
FIG. 4 is a flow diagram depicting an example of automatically updating or modifying one or more compatible distributed data files across multiple data streams based on event data, according to some embodiments.

FIG. 4 is a flow diagram depicting an example of automatically updating or modifying one or more compatible distributed data files across multiple data streams based on event data, according to some embodiments. Flow 400 may be an example of implementing a cross-stream data processor in accordance with various examples described herein. At 402, multiple application program interfaces ("APIs") may be activated to receive different data streams via a "message throughput data pipe," the different data streams being associated with multiple data sources. Examples of each of the multiple sources, such as hosted user-generated video content, may include computing devices having a processor and memory to generate and host executable instructions and/or content. In some cases, the message throughput data pipe may be configured to implement electronic messaging in accordance with a publish-subscribe data messaging architecture to form a "message throughput data pipe."

At 404, features from one or portions of data may be extracted using, for example, APIs subsequent to initiating the extraction of data. Initiation of the extraction of data may be caused by user input into a computing device or may be automatically performed in response to an application. At 406, data representing event-related data across multiple data sources may be identified based on, for example, extracted feature data. At 408, event-related data may be correlated among various multiple data sources to form data representing an "event." That is, correlated event-related data may identify an event as being indicative of dynamic changes in states of multiple pieces of code (or executable instructions), or indicative of dynamic changes in content reflective of changes to an environment (e.g., technical environments, geographic environments, social environments, political environments, retail and merchant environments, etc.).

In some examples, extraction of feature data may include analyzing data representing one or more of executable instructions, text, video, and/or audio to derive event-related data, and correlating event-related data to identify, for example, one or more text terms or tokens representing an event. In at least one example, extraction of features may include executing instructions to create word vectors disposed in a vector space, and calculating degrees of similarity among word vectors to predict contextual terms to identify one or more text terms associated with an event. According to various examples, natural language processing techniques may be used to calculate similar text terms that may be associated together to represent event data. In one example, an algorithm implementing cosine similarity may be used in neural networks to determine similar units of text and/or context that may be used to identify event data (e.g., in machine learning algorithms, deep learning algorithms, and other natural language algorithmic functions).

At 410, data associated with an event may be classified into one or more state classifications to indicate, for example, at least a degree of compatibility of target data files to receive data for integration. In some examples, supplemental data (e.g., metadata) may be classified to determine one or more states of the supplemental data, which may be used to identify an event and/or classification of data files (e.g., text documents) to determine compatibility. At 412, instructions to apply data defining compatibility of data may be executed to determine compatible data at multiple data sources. At 414, compatible data may be identified for integration with a subset of multiple data sources. At 416, a subset of integration data may be transmitted via a messaging service to integrate with at least subset of multiple data sources.

In some examples, a cross-stream data processor may be configured to determine whether event data may change temporally. For example, a cross-stream data processor may be configured to detect a value representing an event over time to determine an amount of diffusivity of the event among the multiple data sources. In response to the amount of diffusivity, another event may be determined. Further, a cross-stream data processor may be configured to extract other features from one or more other portions of data using APIs to identify data representing other event-related data across multiple data sources. The other event-related data may be correlated with similar event data to form data representing another event, whereby a subsequent event may cause modification of data files via subsequent integration of data.

Figure 5:
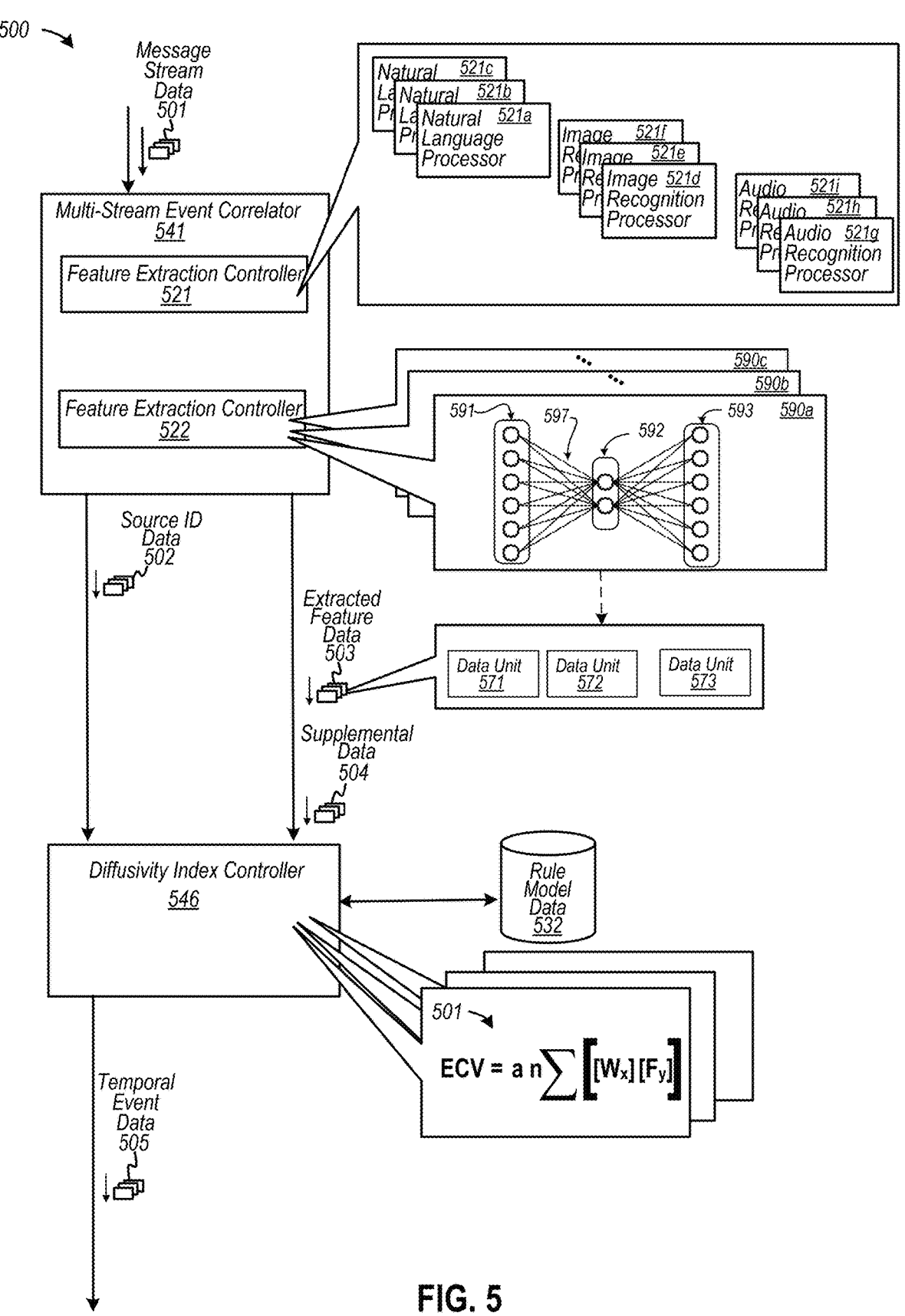
FIGS. 5 and 6 are diagrams depicting functional block diagrams of another example of a cross-stream data processor, according to some embodiments.
Figure 6:
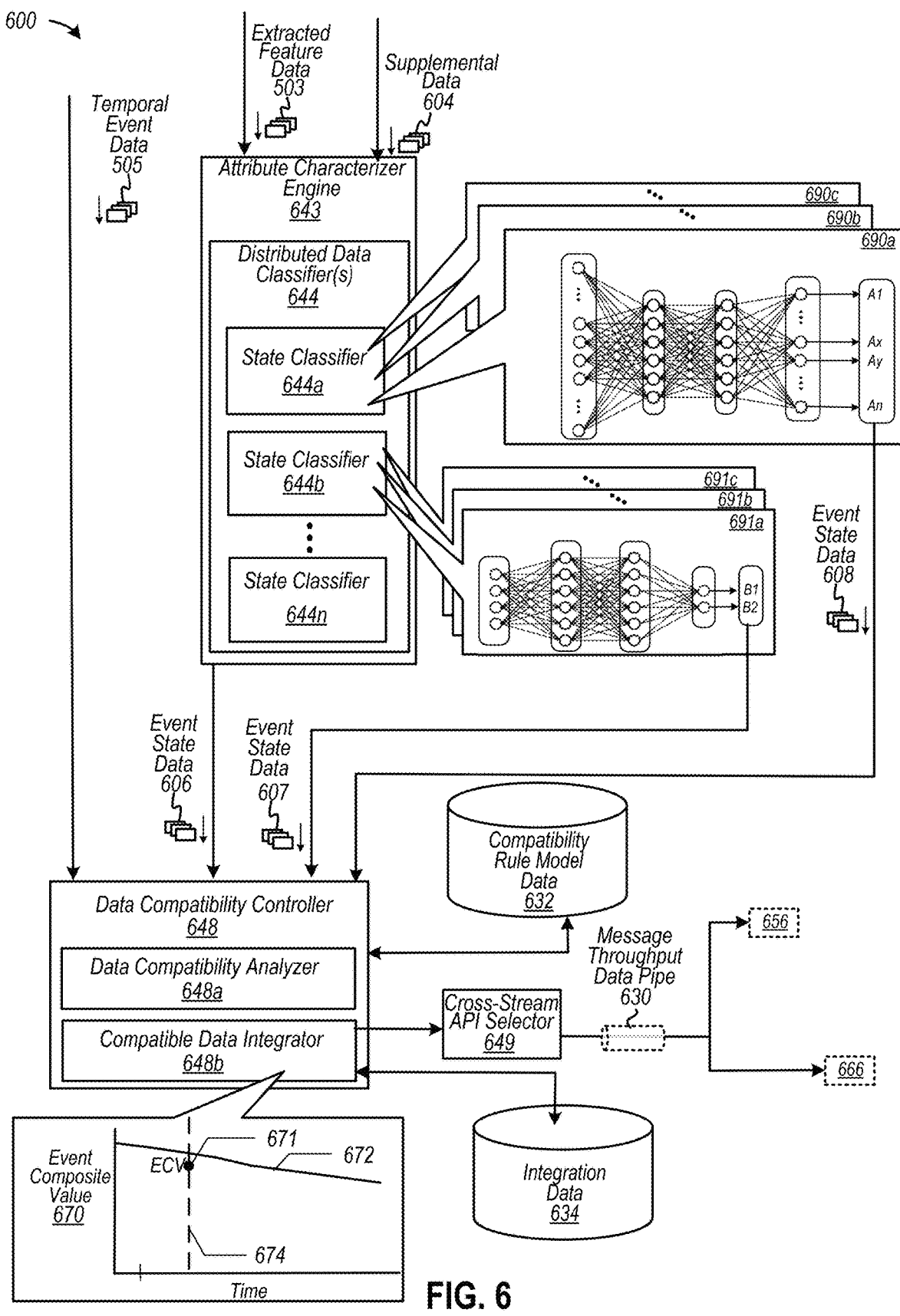

FIGS. 5 and 6 are diagrams depicting functional block diagrams of another example of a cross-stream data processor, according to some embodiments. Diagram 500 of FIG. 5 depicts a portion of a cross-stream data processor that includes a multi-stream event correlator 541 and a diffusivity index controller 546. Multi-stream event correlator 541 is shown to include any number of feature extraction controllers configured to extract features from message data or data associated with distributed data files. Examples of feature extraction controllers include feature extraction controllers 521 and 522. Diagram 600 of FIG. 6 depicts another portion of a cross-stream data processor that includes an attribute characterizer engine 643 and a data compatibility controller 648. Attribute characterizer engine 643 is shown to include distributed data classifiers 644, which may include any number of state classifiers 644a to 644n. Data compatibility controller 648 is shown to include a data compatibility analyzer 648a and a compatible data integrator 648b. Further to diagram 600, data compatibility controller 648 may be coupled to a data repository, such as compatibility rule model data 632. Note that elements depicted in diagram 500 of FIG. 5 and diagram 600 of FIG. 6 may include structures and/or functions as similarly-named or similarly-numbered elements depicted in other drawings.

Referring to FIG. 5, multi-stream event correlator 541 may include logic configured to receive and process message stream data 501, which may include electronic message data (e.g., published-subscribe messages) from any number of distributed data sources, such as computing platforms supporting YouTube® video content, Twitter® (or X™) text content, and any other source of data, whereby electronic message data may include content data (or portions thereof) and/or supplemental data (e.g., metadata) regarding the same.

Feature extraction controllers 521 and 522 may include any number of feature extraction processes to, for example, extract feature data to analyze content data and supplemental data. Feature extraction controllers 521 and 522 may be further configured to generate a number of feature vectors to perform pattern recognition, predictive or probabilistic data analysis, machine learning, deep learning, or any other algorithm (e.g., heuristic-based algorithms) to identify at least a subset of features that may constitute an event (as derived from data from various data sources).

In the example shown, feature extraction controller 521 may include any number of natural language processor algorithms 521a to 521c, any number of image recognition processor algorithms 521d to 521f, any number of audio recognition processor algorithms 521g to 521i, or any other set of algorithms. Examples of natural language processor algorithms 521a to 521c may include algorithms to tokenize sentences and words, perform word stemming, filter out stop or irrelevant words, or implement any other natural language processing operation to determine text-related features. Image recognition processor algorithms 521d to 521f may be configured to perform character recognition, facial recognition, or implement any computer vision-related operation to determine image-related features. Audio recognition processor algorithms 521g to 521i may be configured to perform speech recognition, sound recognition, or implement any audio-related operation to determine audio-related features.

Feature extraction controller 522 may include any number of predictive data modeling algorithms 590a to 590c that may be configured to perform pattern recognition and probabilistic data computations. For example, predictive data modeling algorithms 590a to 590c may apply "k-means clustering," or any other clustering data identification techniques to form clustered sets of data that may be analyzed to determine or learn optimal classifications of event data and associated outputs and supplemental data related thereto. In some examples, feature extraction controller 522 may be configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SUM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 590a to 590c may include any algorithm configured to extract features and/or attributes based on classifying data or identifying patterns of data, as well as any other process to characterize subsets of data.

In the example shown, feature extraction controller 522 may be configured to implement any number of statistical analytic programs, machine-learning applications, deep-learning applications, and the like. Feature extraction controller 522 is shown to have access to any number of predictive models, such as predictive model 590a, 590b, and 590c, among others. As shown, predictive data model 590a may be configured to implement one of any type of neuronal networks to predict an action or disposition of an electronic message, or any output representing an extracted feature for determining either an event or supplemental data to determine compatibility, or both. A neural network model 590a includes a set of inputs 591 and any number of "hidden" or intermediate computational nodes 592, whereby one or more weights 597 may be implemented and adjusted (e.g., in response to training). Also shown, is a set of predicted outputs 593, such as text terms defining an event, among any other types of outputs.

Feature extraction controller 522 may include a neural network data model configured to predict (e.g., extract) contextual or related text terms based on generation of vectors (e.g., word vectors) with which to determine degrees of similarity (e.g., magnitudes of cosine similarity) to, for example, establish contextual compatibility, at least in some examples. Output data 593 as contextual or related text terms may be used to identify event data (e.g., an event). In at least one example, feature extraction controller 522 may be configured to implement a "word2vec" natural language processing algorithm or any other natural language process that may or may not transform, for example, text data into numerical data (e.g., data representing a vector space). According to various other examples, feature extraction controller 522 may be configured to implement any natural language processing algorithm.

In view of the foregoing, multi-stream event correlator 541 may be configured to implement various feature extraction functions to extract features that may be correlated to identify one or more groups of data units 571 to 573 as extracted feature data 503, whereby each group of data units 571 to 573 may be associated with an event. For example, data unit 571 may represent extracted text term "YouTube," data unit 572 may represent extracted text term "API," and data unit 573 may represent extracted text term "Update," whereby data units 571 to 573 may correlate to an event in which a major software update or revision may affect a prominent number of distributed data files that implement such an API. As another example, data unit 571 may represent extracted text term "COVID," data unit 572 may represent extracted text term "Vaccine," and data unit 573 may represent extracted text term "Death," whereby data units 571 to 573 may correlate to an event in which various distributed data files updates to content that may describe recent death rates due to COVID-19 vaccines.

Diffusivity index controller 546 may be configured to receive extracted feature data 503 and supplemental data 504, as well as source ID data 502 that identifies distributed data sources from which feature data may be extracted. Output data from feature extraction controllers 521 and 522, as well as output data from multi-stream event correlator 541, may be used to either identify an event or provide contextual data, or both, to identify the event and compatibility of the distributed data sources to receive integrated data.

As shown, diffusivity index controller 546 may be coupled to a data repository 532 that may include rule model data to determine one or more events, according to at least one example. For instance, rule model data 532 may include values of weighting factors to be applied to values of extracted features to compute an event composite value representative of an event. In a non-limiting example, an event composite value ("ECB") may be computed in accordance with relationship 501 in which a value of extracted feature ("Fee") may be adjusted by a value represented by a weighting factor value ("Wax"). An aggregation (e.g., a summation) of each weighted feature value may be used to identify an event. In some cases, an aggregated event composite value may be optionally normalized by application of a normalization factor or function ("nix"), according to some examples. A correction factor "a" may be applied to resolve errors or to fine-tune the result. Again, relationship 501 is an example of one of any number implementations that may be applied by diffusivity index controller 546 to identify "diffusive," or viral events. Returning to the above example, an event composite value for an event defined by terms "YouTube+API+Update" may be greater than an event composite value for an event defined by terms "COVID+Vaccine+Death," and, as such, may be representative of a more prominent or diffusive (e.g., viral) event. Diffusivity index controller 546 may transmit temporal event data 505 to attribute characterizer engine 643 and data compatibility controller 648, both of FIG. 6, whereby temporal event data 505 may include event composite values, extracted feature data, supplemental data, any other data output, and/or any other data receive from distributed data sources.

Referring to FIG. 6, attribute characterizer 643 is configured to receive extracted feature data 503 of FIG. 5 and supplemental data 604, which may include queried data from multiple streams of electronic messages. In various examples, attribute characterizer engine 643 may be configured to characterize distributed data files and content to determine whether those distributed data files and content are compatible with data integration. Referring again to the above example, consider that attribute characterizer engine 643 may be configured to classify various states of distributed data sources to determine data integrations related to an event defined by COVID+Vaccine+Death terms are neither compatible nor suitable with data sources (e.g., API code) for which updates to APIs have been applied for a YouTube video platform (i.e., data integrations related to COVID-19 may relate to a different, unrelated event than that defined by YouTube+API+Update terms).

In the example shown, state classifiers 644a and 644b may be configured to implement any number of statistical analytic programs, machine-learning applications, deep-learning applications, and the like. State classifier 644a may include any number of predictive models, such as predictive models 690a, 690b, and 690c, and state classifier 644b may include one or more predictive models, such as predictive models 691a, 691b, and 691c. Predictive models 690 and 691 may be implemented similar to, or equivalent to, predictive models described in FIG. 5. In the example shown, state classifier 644a may receive inputs of any combination of extracted feature data 503 and supplemental data 604 to compute event state data 608. For example, inputs to state classifier 644a may determine event state data 608 indicates that data source relates to either a specific "programming language" of distributed data file (e.g., Java, Python, etc.) or a spoken language (e.g., English, Mandarin, Farsi, etc.). As another example, inputs into state classifier 644b may determine event state data 607 that indicates one of a positive state, a neutral state, or a negative state (e.g., based on sentiment analysis relative to content of data source). Other state classifiers, such as state classifier 644n, may generate other event state data 606 characterizing a distributed data file for subsequent evaluation as to the compatibility of integrating data.

Data compatibility controller 648 may be configured to receive temporal event data 505 to identify event data, and may be further configured to receive event state data 606 to 608 to characterize compatibility of integrating one or more subsets of data. Also, data compatibility controller 648 may be coupled to compatibility rule model data 632, which may include data representing various rules and models with which to determine compatibility of integrating data, such as integration data 634, based on temporal event data 505 and event state data 606 to 608. Integration data 634 may include data representing executable instructions in view of an event (e.g., a code update to revised distributed software or applications), or may include data representing content (e.g., an update to content responsive to a prominent event in any environment). For example, integration data 634 directed to COBOL may not be compatible to data sources implementing Python or other programming languages. As another example, integration data 634 directed to content relating to firearms or adult content may not be compatible to data sources that include content directed to children.

Data compatibility analyzer 648a may be configured to identify subsets of integration data 634 that may be compatible with a subset of data sources. Compatible data integrator 648b may be configured to transmit compatible integration data 656 and 666 to targeted data sources via message throughput data pipe 630, as selected by a cross-stream API selector 649. Compatible data integrator 648b may also be configured to monitor an influence of an event over time, whereby the influence of the event may be depicted as an event composite value 670. For example, compatible data integrator 648b may monitor event composite value 670 to detect a specific event composite value ("ECV") 671 at time 674. As shown, ECV 671 may have decreased (e.g., became less diffusive or prominent) over time, and another event having event composite values 672 may be greater. In this case, compatible data integrator 648b may also be configured to modify the implementation of integration data 656 and 666 based on, for example, decreased relevancy.

In view of the foregoing, structures and/or functionalities depicted in FIGS. 5 and 6 as well as other figures herein, may be implemented as software, applications, executable code, application programming interfaces ("APIs"), processors, hardware, firmware, circuitry, or any combination thereof.

FIG. 7 illustrates an exemplary layered architecture for implementing a cross-stream data processor application, according to some examples. Diagram 700 depicts application stack ("stack") 701, which is neither a comprehensive nor a fully inclusive layered architecture for detecting changes in event data in distributed data files, and in response, automatically updating or modifying one or more compatible distributed data files. One or more elements depicted in diagram 700 of FIG. 7 may include structures and/or functions as similarly-named or similarly-numbered elements depicted in other drawings, or as otherwise described herein, in accordance with one or more examples, such as described relative to FIGS. 1-3 or any other figure or description herein.

Application stack 701 may include a cross-stream data processor layer 750 upon application layer 740, which, in turn, may be disposed upon any number of lower layers (e.g., layers 703a to 703d). Cross-stream data processor layer 750 may be configured to provide functionality and/or structure to implement a cross-stream data processor application, as described herein. Further, cross-stream data processor layer 750 and application layer 740 may be disposed on data exchange layer 703d, which may implemented using any programming language, such as HTML, JSON, XML, etc., or any other format to effect generation and communication of requests and responses among computing devices and computational resources constituting an enterprise or an entity and a planning application and/or platform configured to disseminate information expeditiously, such as information regarding products or services aligned with data in targeted data sources compatible with data integration. Data exchange layer 703d may be disposed on a service layer 703c, which may provide a transfer protocol or architecture for exchanging data among networked applications. For example, service layer 703c may provide for a RESTful-compliant architecture and attendant web services to facilitate GET, PUT, POST, DELETE, and other methods or operations. In other examples, service layer 703c may provide, as an example, SOAP web services based on remote procedure calls ("RPCs"), or any other like services or protocols (e.g., APIs). Service layer 703c may be disposed on a transport layer 703b, which may include protocols to provide host-to-host communications for applications via an HTTP or HTTPS protocol, in at least this example. Transport layer 303b may be disposed on a network layer 703a, which, in at least this example, may include TCP/IP protocols and the like.

As shown, cross-stream data processor layer 750 may include (or may be layered upon) an application layer 740 that includes logic constituting a multi-stream event correlator layer 724, a diffusivity index controller layer 720, an attribute characterizer engine layer 726, a data compatibility controller layer 722, and a messaging layer 710. In various examples, layers 720, 722, 724, and 726 may include logic to implement the various functionalities described herein. Messaging layer 710 may include logic to facilitate publish-subscribe messaging services, such as provided by a Google® Cloud Pub/Sub messaging architecture.

Any of the described layers of FIG. 7 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by Sightly Enterprises, Inc., or the like. The above-described techniques may be varied and are not limited to the embodiments, examples or descriptions provided.

Figure 8:
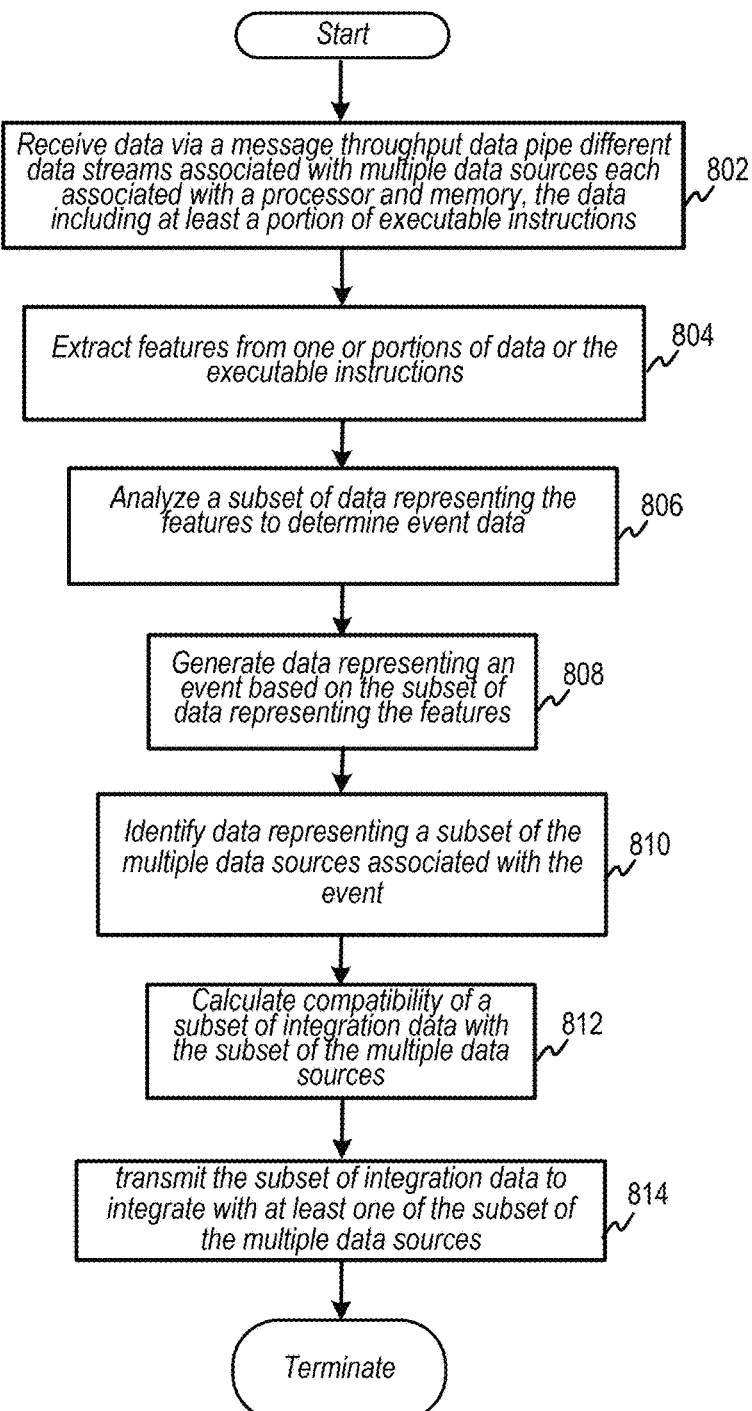
FIG. 8 is a flow diagram as an example of correlating event data across multiple data streams to identify compatible distributed data files with which to integrate data, according to some embodiments.

FIG. 8 is a flow diagram as an example of correlating event data across multiple data streams to identify compatible distributed data files with which to integrate data, according to some embodiments. Flow 800 is another example of implementing a cross-stream data processor in accordance with various examples described herein. At 802, different data streams may be received via a message throughput data pipe, the different data streams being associated with Tmultiple data sources.

At 804, features may be extracted from one or portions of data, such as content data and/or the executable instructions, any which may be disposed at any number of distributed data sources. At 806, a subset of data representing extracted features may be analyzed to determine event data. In some examples, electronic messages, which include subsets of the extracted features, may be batched to form batched electronic messages. The batched electronic messages may be stored temporarily in, for example, cloud storage for query and analysis. In other examples, electronic messages may be "batched" as a group that may be transient without a need to be stored. Further, extracted features may be determined by executing instructions to implement one or more natural language processors to determine event data based on the extracted features. In at least one example, at least one natural language processor maybe configured to filter text terms and apply a predictive or machine learning algorithm to generate vectors to identify text terms. Further, the natural language processor may be configured to calculate data representing degrees of similarity among the vectors to identify event data, based on the vectors identifying the text terms. In some implementations, similar text terms and context may be used to define an event.

At 808, data representing an event may be generated based on the subset of data representing the extracted features. At 810, data representing a subset of multiple data sources associated with an event can be identified. In some examples, an event may be identified based on supplemental data as event indicators, which may be received into a diffusivity index controller. The diffusivity index controller may be configured to classify event data based on the supplemental data to characterize a rate of diffusivity among different data streams to, for example, identify a prominent or prioritized event (e.g., an event associated with a greater amount of diffusivity or virality). According to some examples, a rate of diffusivity may refer to a rate of propagation of event-related data across multiple data sources during an interval of time, the rate of propagation being determined, at least in part, by extracting an amount of feature data associated with an event within a time interval. In some examples, supplemental data may include metadata in different data formats, each data format being associated with each of the multiple data sources. Alternatively, supplemental data may also include one or more of time range-related data, location-related data, and quantity-related data, each of which may be implemented to detect event data in one or more of the subsets of multiple data sources.

At 812, compatibility of a subset of integration data can be calculated to optimize integration of data with a subset of compatible data sources. For example, compatibility may be computed to classify a subset of multiple data sources to identify one or more states defining attributes of compatibility. Subsequently, a processor may be configured to automatically select sets of integration data based on attributes of compatibility (e.g., relative to distributed data files). At 814, a subset of compatible integration data may be transmitted for integration into at least one subset of multiple data sources. For example, a subset of compatible integration data may include brand-specific content (e.g., video or text) directed to age-appropriate content (e.g., teddy bears) that may integrate within a data source that promotes children's toys.

Figure 9:
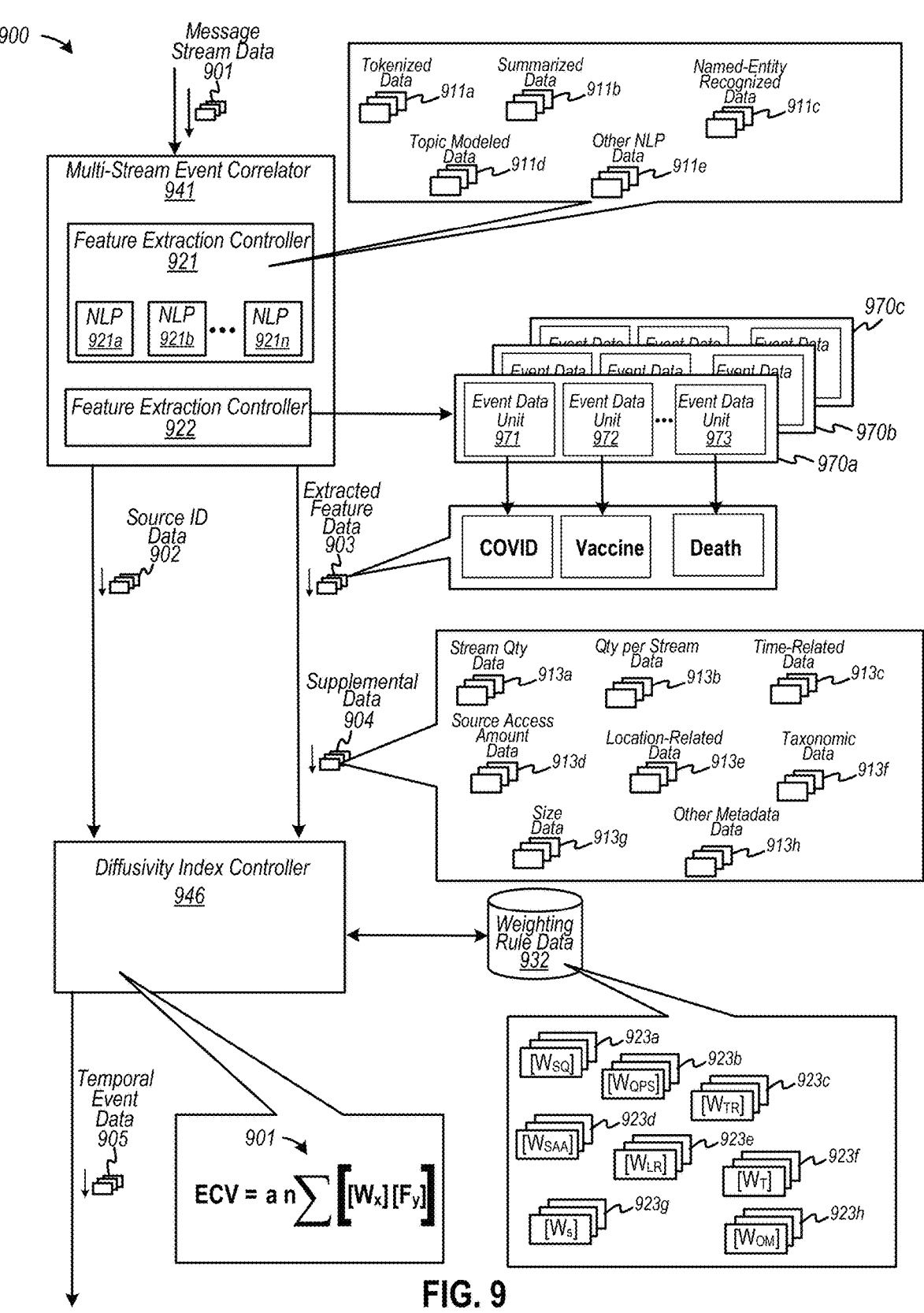
FIGS. 9 and 10 are diagrams depicting functional block diagrams of a specific example of a cross-stream data processor, according to some embodiments.
Figure 10:
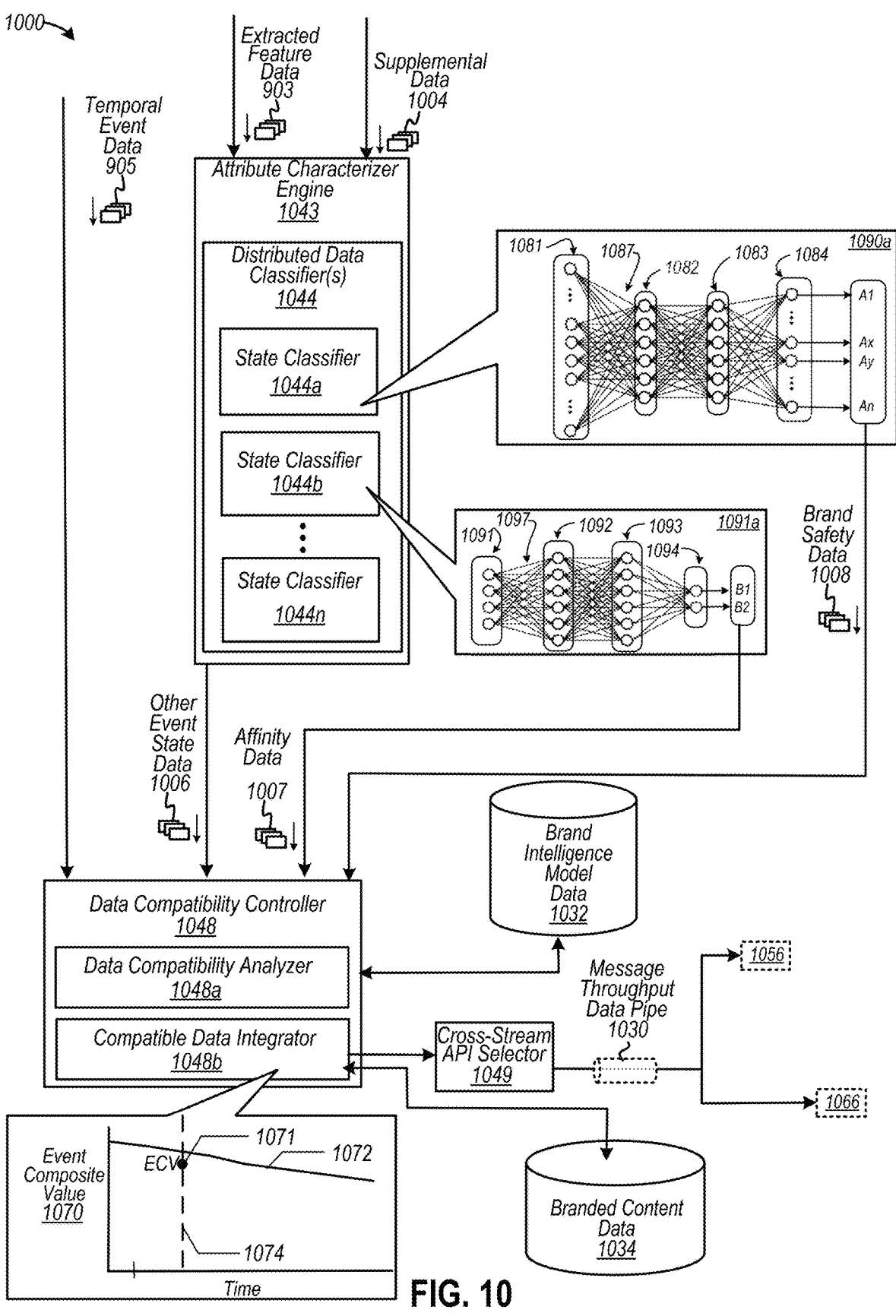

FIGS. 9 and 10 are diagrams depicting functional block diagrams of a specific example of a cross-stream data processor, according to some embodiments. Diagram 900 of FIG. 9 depicts a portion of a cross-stream data processor that includes a multi-stream event correlator 941 and a diffusivity index controller 946. Multi-stream event correlator 941 is shown to include any number of feature extraction controllers configured to extract features from message data or data associated with distributed data files. Examples of feature extraction controllers include feature extraction controllers 921 and 922. Diagram 1000 of FIG. 10 depicts another portion of a cross-stream data processor that includes an attribute characterizer engine 1043 and a data compatibility controller 1048. Attribute characterizer engine 1043 is shown to include distributed data classifiers 1044, which may include any number of state classifiers 1044a to 1044n. Data compatibility controller 1048 is shown to include a data compatibility analyzer 1048a and a compatible data integrator 1048b. Further to diagram 1000, data compatibility controller 1048 may be coupled to a data repository, such as a brand intelligence model data 1032. In some examples, brand intelligence model data 1032 may include "Brand Mentality®" data, as provided by Sightly Enterprises, Inc. Note that elements depicted in diagram 900 of FIG. 9 and diagram 1000 of FIG. 10 may include structures and/or functions as similarly-named or similarly-numbered elements depicted in other drawings.

In the examples of FIGS. 9 and 10, a computing and data platform may be configured to implement logic to analyze data associated with multiple different data sources to determine one or more events during a range of time. Based on an event (or a type of an event), overall data traffic driven to access multiple different data sources may increase expeditiously as correlated event data propagates across multiple data sources. The multiple different data sources may provide for integration of data, such as inclusion of data representing information about a product or service. A cross-stream data processor may be configured to integrate data representing branded content directed to a product or service into a data source that may be compatible with the branded content data. Further, a subset of compatible integration data may also include intra-brand content data, which may include data representing different products or services associated with a brand. The intra-brand content data may include data representing different compatibility requirements based on different profiles associated with a common brand. As prominence and diffusivity of events and content of various data sources dynamically change over time, a cross-stream data processor, as described herein, may be configured to optimize accesses to integrated or branded content (e.g., maximized outcomes for branding information) at optimal data sources (e.g., data integrations aligned with requirements of branded content that aim to preserve brand reputation and loyalty).

Referring to FIG. 9, multi-stream event correlator 941 may include logic configured to receive and process message stream data 901, which may include electronic message data from any number of distributed data sources, such as computing platform supporting YouTube® video content, Twitter® text content, and any other source of data, whereby electronic message data may include content data (or portions thereof) and/or supplemental data (e.g., metadata) regarding same.

Feature extraction controllers 921 and 922 may include any number of feature extraction processes to, for example, extract feature data to analyze content data and supplemental data. As described herein, feature extraction controllers 921 and 922 may be further configured to generate a number of feature vectors to perform pattern recognition, predictive or probabilistic data analysis, machine learning, deep learning, or any other algorithm (e.g., heuristic-based algorithms) to identify at least a subset of features that may constitute an event as derived from data from various data sources.

In the example shown, feature extraction controller 921 may include any number of natural language processor algorithms 921a to 921n, any of which may be configured to generate natural language processing-related data, such as tokenized data 911a, summarized data 911b, name-entity recognized data 911c, topic-modeled data 911d, and other natural language processing data 911e. Feature extraction controller 922 may include any number of predictive data modeling algorithms to compute groups of event data 970a, 970b, and 970c for corresponding intervals of time. For example, feature extraction controller 922 may determine that event data units 971, 972, and 973 correspond to respective terms "COVID," "Vaccine," and "Death," which may be transmitted to diffusivity index controller 946 as extracted feature data 903. Source identification data 902, which is associated with extracted feature data 903, may also be transmitted to diffusivity index controller 946.

Multi-stream event correlator 941 may also generate and/or transmit supplemental data 904, which may include derived data or data extracted from metadata. In this example, supplemental data 904 includes data representing a quantity of data streams correlated with event data ("Stream Qty Data") 913a, a quantity of event instances detected in a stream of data ("Qty per Stream Data") 913b, time-related data 913c, an amount of times that a data source (e.g., a webpage or YouTube video) is accessed or viewed ("Source Access Amount Data") 913d, location-related data 913e, taxonomic data 913f (e.g., industry or other business classifications), size data 913g (e.g., data size of a distributed data file), and other metadata 913h, such as metadata indicating a specific language (e.g., German), among other types of metadata. Note that in some examples, supplement data 904 may include metadata generated by YouTube Data API, such as a $3^{rd}$ Version thereof.

Diffusivity index controller 946 may be configured to receive extracted feature data 903 and supplemental data 904, as well as source ID data 902 that identifies distributed data sources from which feature data may be extracted. Output data from feature extraction controllers 921 and 922, as well as output data from multi-stream event correlator 941, may be used to either identify an event or provide contextual data, or both, to identify the event and compatibility of the distributed data sources to receive integrated data. As shown, diffusivity index controller 946 may be coupled to a data repository 932 that may include weighting factor rule data to determine one or more events, according to at least one example. Data repository 932 may include weighting factor values 923a to 923h for application against data 913a to 913h, respectively. According to some examples, weighting factor values 923a to 923h may be customizable as a function of data provided via user inputs from user interfaces (not shown). In some cases, weighting factor values 923a to 923h may be customizable, automatically (by a processor), based on various other sources of data, as described herein.

In a non-limiting example, an event composite value ("ECV") may be computed in accordance with relationship 901 in which values of extracted feature data ("Fy"), such as data values 913a to 913h, may be adjusted by weighting factor values ("Wx") in weighting factor rule data repository 932. Diffusivity index controller 946 may be configured to transmit temporal event data 905 to attribute characterizer engine 1043 and data compatibility controller 1048, both of FIG. 10, whereby temporal event data 905 may include event composite values, extracted feature data, supplemental data, any other data output, and/or any other data receive from distributed data sources. In some examples, diffusivity index controller 946 may be configured to implement a virality index in accordance with proprietary software developed by Sightly Enterprises, Inc., of San Diego, California.

Referring to FIG. 10, attribute characterizer 1043 may be configured to receive extracted feature data 903 of FIG. 9 and supplemental data 1004. In various examples, attribute characterizer engine 1043 may be configured to characterize data sources, such as YouTube videos and related content to determine whether target data sources are compatible with the integration of branded content. In the example shown, state classifier 1044a and 1044b may be configured to implement any number of statistical analytic programs, machine-learning applications, deep-learning applications, and the like. State classifier 1044a may include any number of predictive models, such as predictive model 1090a. In this example, predictive model 1090a may receive any input combination of extracted feature data 903 of FIG. 9 and supplemental data 1004 to generate brand safety output data 1008. For example, outputs A1, . . . , Ax, Ay, . . . . An may generate brand safety output data 1008 indicative of one or more states of brand safety: military conflict, obscenity, drugs, tobacco, adult, firearms, crime, death/injury, online piracy, hate speech, terrorism, spam/harmful sites, and fake news, any of which may be used to classify distributed data source for compatibility of integrating branded content date. In at least some examples, brand safety output data 1008 may be indicative of one or more states of brand safety (and values thereof) in accordance with governing requirements set forth by the Global Alliance for Responsible Media ("GARM") as maintained by the World Federation of Advertisers ("WFA") of Brussels, Belgium. As another example, inputs into state classifier 1044b may cause predictive model 1091a to generate affinity data 1007 indicating sentiment state data, such as whether a distributed data file may be associated with a positive affinity state, a neutral affinity state, or a negative affinity state. In accordance with at least some examples, affinity data 1007 (e.g., sentiment state data or other like data) may include a range of data values that can include data values ranging from a maximal value of a positive affinity state to a maximal negative affinity state, the range including at least a subset of one or more data values representing a neutral affinity state. Thus, affinity data 1007 may include a range of affinity values (e.g., sentiment values). Other state classifiers, such as state classifier 1044n, may generate other event state data 1006 characterizing a distributed data file for subsequent evaluation as to the compatibility of integrating data.

Data compatibility controller 1048 may be configured to receive temporal event data 905 to identify event data, and may be further configured to receive event state data 1006 to 1008 to characterize compatibility of integrating one or more subsets of branded content data. Also, data compatibility controller 1048 is coupled to brand intelligence model data 1032, which may include data representing various rules and models with which to determine compatibility of integrating data, such as branded content data 1034, based on temporal event data 905 and event state data 1006 to 1008. Branded content data 1034 may include data representing executable instructions to present branded content or may include data representing content (e.g., audio, text, video, etc.). As an example, branded content data 1034 directed to content relating to children's toys may not be compatible for integration with data sources that depict videos of death, war, accidents, illnesses, or other age-inappropriate content.

Data compatibility analyzer 1048a may be configured to identify subsets of branded content data 1034 that may be compatible with a subset of data sources, such as a subset of YouTube channels. Compatible data integrator 1048b may be configured to transmit compatible branded content data 1056 and 1066 to targeted YouTube channels via message throughput data plate 1030, as selected by a cross-stream API selector 1049. Compatible data integrator 1048b may also be configured to monitor an influence of an event over time, whereby the influence of the event may be depicted as an event composite value 1070. For example, compatible data integrator 1048b may monitor event composite value 1070 to detect a specific event composite value ("ECV") 1071 at time 1074. As shown, ECV 1071 may decrease (e.g., become less diffusive or prominent) over time, and another event having event composite values 1072 may have a greater value. In this case, compatible data integrator 1048b may also be configured to modify the implementation of branded content data 1056 and 1066 based on, for example, decreased relevancy.

In view of the foregoing, structures and/or functionalities depicted in FIGS. 9 and 10 as well as other figures herein, may be implemented as software, applications, executable code, application programming interfaces ("APIs"), processors, hardware, firmware, circuitry, or any combination thereof.

Figure 11:
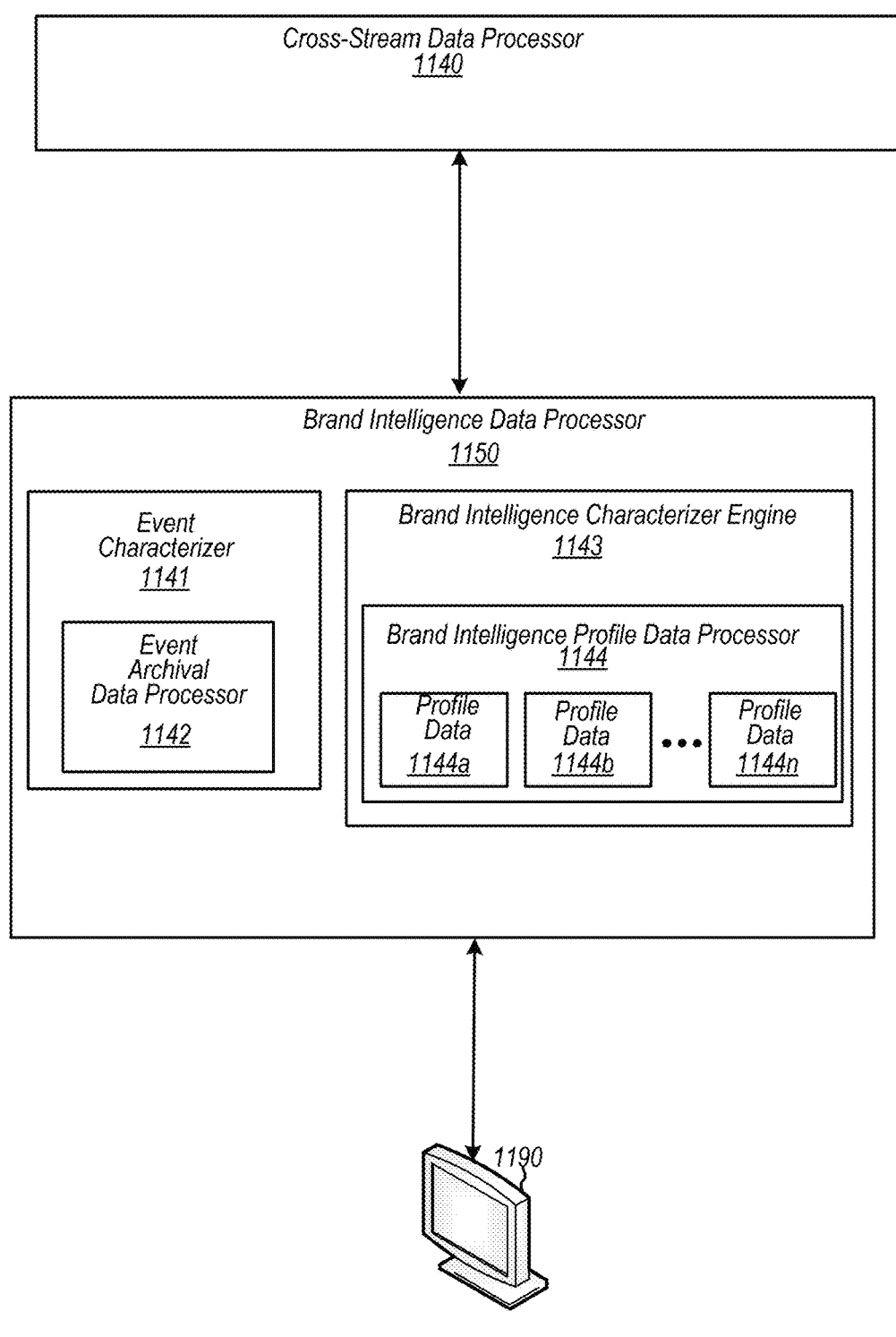
FIG. 11 includes an example of a brand intelligence data processor configured to characterize multiple data sources to determine compatibility with which to integrate data, according to some embodiments.

FIG. 11 includes an example of a brand intelligence data processor configured to characterize multiple data sources to determine compatibility with which to integrate data, according to some embodiments. Diagram 1100 includes a brand intelligence data processor 1150 coupled to a cross-stream data processor 1140 to receive and analyze, over multiple intervals of time, extracted event features. Example of extracted features include text-related features, video-related features, image-related features, audio-related features, and other feature data. Brand intelligence data processor 1150 may include an event characterizer 1141 and a brand intelligence characterizer engine 1143.

Event characterizer 1141 is shown to include an event archival data processor 1142. In some examples, event archival data processor 1142 may be configured to archive and store data describing event-related data for a particular data source (e.g., a particular YouTube channel). Brand intelligence characterizer engine 1143 is shown to include a brand intelligence profile data processor 1144 that is configured to monitor and archive the extracted features over time to determine contextual data in which an entity may be serving branded content in different data sources 1190. Further, brand intelligence characterizer engine 1143 may be further configured to generate predicted brand mentality profile data 1144a to 1144n, whereby predicted data profiles 1144a to 1144n may be implemented as a knowledge graph of compatible data sources that is determined a priori. As such, a particular entity may be able select a particular data profile 1144a to 1144n that defines compatible data sources at which server or present branded content while satisfying concerns regarding brand safety, brand reputation, and brand loyalty, among others.

Figure 12:
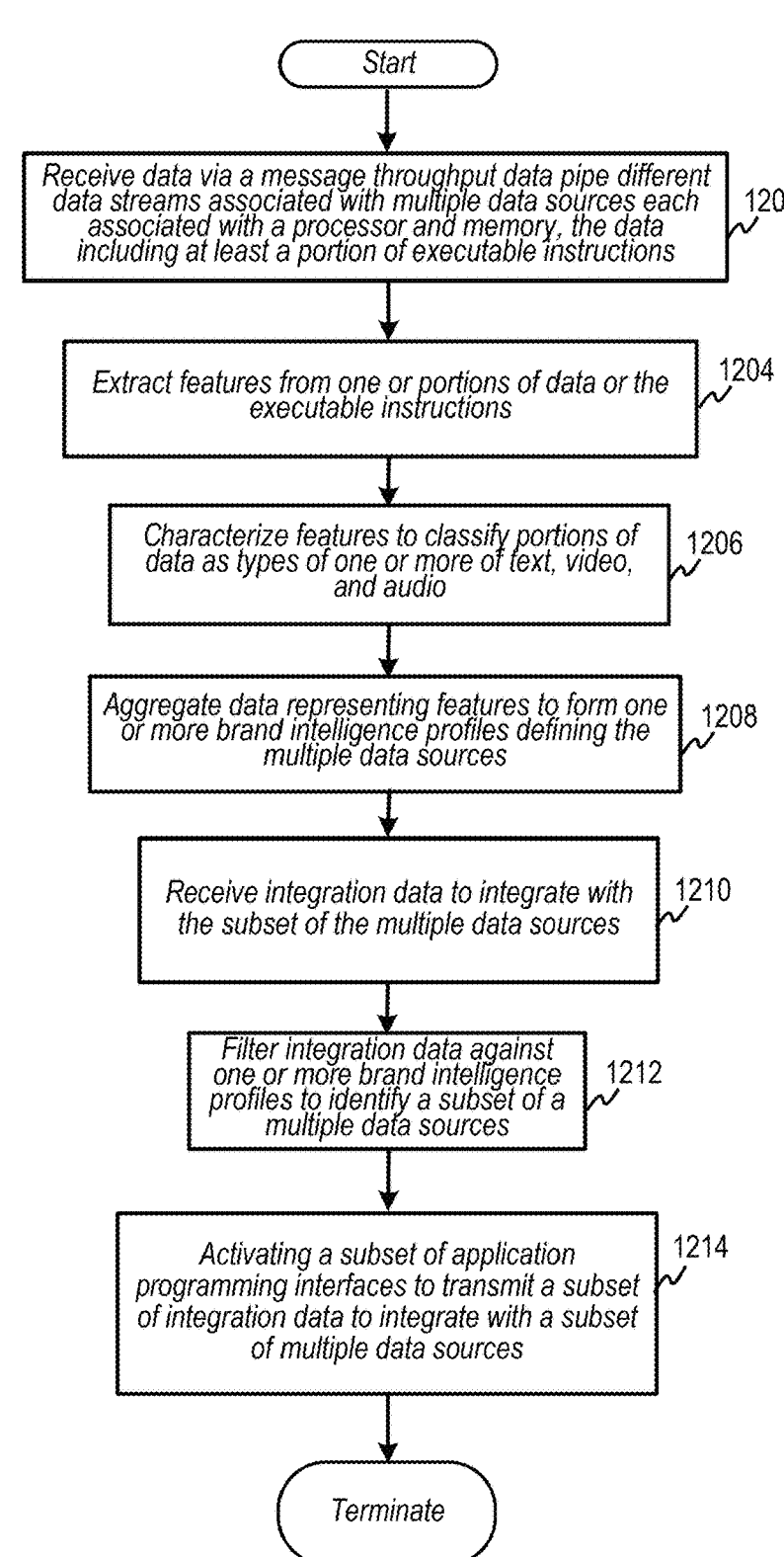
FIG. 12 is a flow diagram as an example of aggregating data to form brand intelligence profiles, according to some embodiments.

FIG. 12 is a flow diagram as an example of aggregating data to form brand intelligence profiles, according to some embodiments. Flow 1200 may begin at 1202, at which different data streams may be received via a message throughput data pipe associated with multiple data sources each associated with a processor and memory, the different data streams including at least a portion of executable instructions. At 1204, a number of features from one or portions of data (e.g., content data) or executable instructions may be extracted to form a number of extracted features. At 1206, extracted features may be characterized to classify portions of data as types of one or more of text, video, and audio. In some examples, extracted features may be correlated to form event data based on features extracted across different data streams. A rate of diffusivity associated with the event data may be computed to identify data files at a subset of multiple data sources based on the rate of diffusivity (note that the rate of diffusivity may broadly encompass and include a rate of virality). At 1208, data representing extracted features may be aggregated to form one or more brand intelligence profiles defining, for example, compatibility of multiple data sources to receive branded content for integration. In some examples, one or more of natural language processing algorithms to extract text, one or more image recognition processing algorithms to extract image data, and one or more audio recognition processing algorithms to extract audio data may be implemented. In one example, aggregation of extracted features may be performed automatically to, for example, generate a knowledge graph of brand-compatible content or data sources, based on the text data, the image data, and the audio data that identify multiple data sources. At 1210, integration data, such as branded content data, may be received from a repository to integrate with a subset of multiple data sources. At 1212, integration data may be filtered against data representing one or more brand intelligence profiles to identify compatible subsets of multiple data sources with which to be integrated branded content. At 1214, a subset of application programming interfaces may be activated to selectively transmit subsets of integration data to integrate with a subset of multiple data sources.

Figure 13:
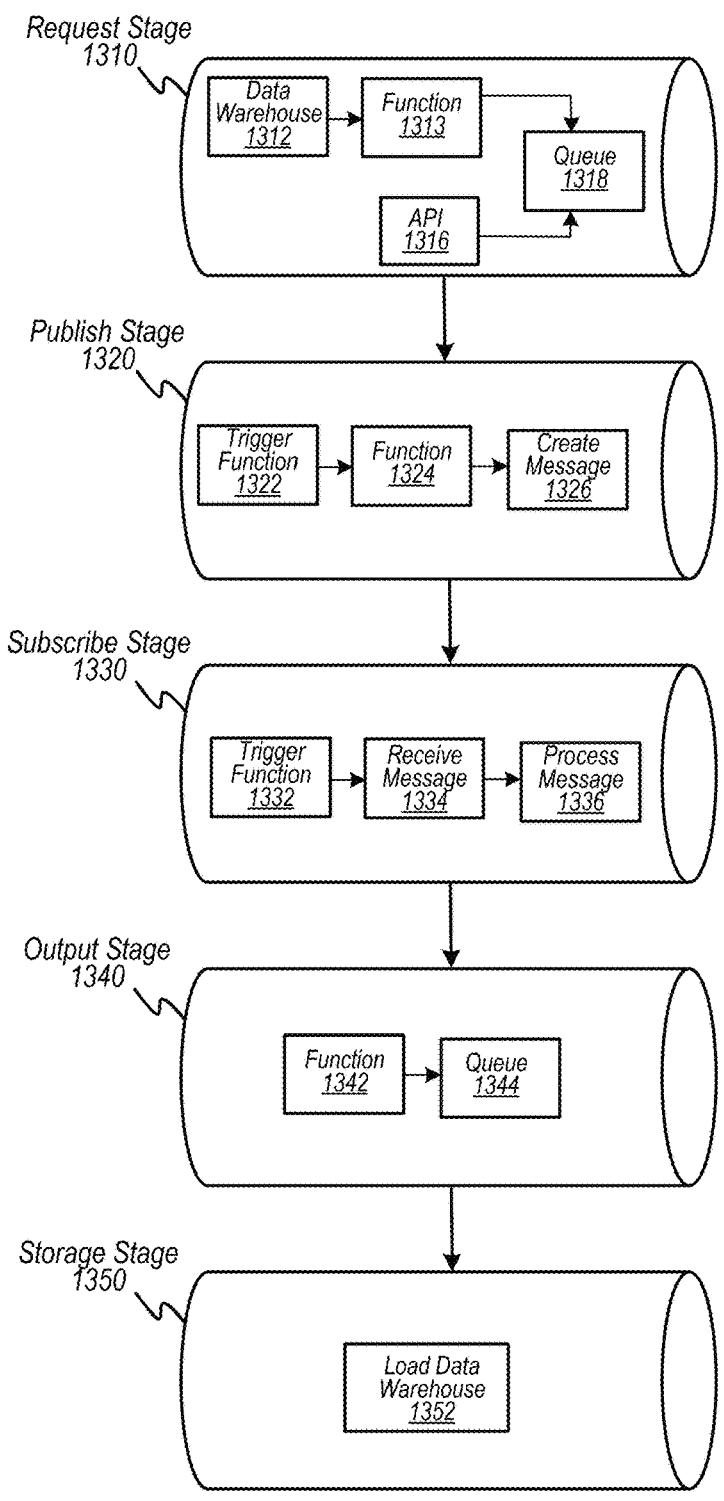
FIG. 13 is a diagram depicting stages of electronic messaging to facilitate correlation of event data across multiple data streams to identify compatible distributed data files with which to integrate data, according to some examples.

FIG. 13 is a diagram depicting stages of electronic messaging to facilitate correlation of event data across multiple data streams to identify compatible distributed data files with which to integrate data, according to some examples. Diagram 1300 depicts functional stages of implementing a messaging service to implement various functions described herein. A request stage 1310 depicts functions to implement requests to access data originating at various distributed data sources. In one example, requests may be stored as files in queue 1318, which may be implemented as cloud storage (e.g., Google cloud storage). Files may be populated in queue 1318 responsive to activation of an API 1316 or a function 1314 (e.g., a Google cloud function application)

that extracts the files from a data warehouse 1312. An example of a data warehouse 1312 is a data warehouse developed and maintained by Snowflake, Inc., of San Mateo, California.

A publish stage 1320 depicts functions to implement publisher processing functions to generate a publish-subscribe message. Trigger function 1322 may be configured to schedule operation of function 1324, which, when activated, can access data from queue 1318. In one example, trigger function 1322 may be implemented with a Google cloud scheduler application, and function 1324 may be implemented with a Google cloud function application. Create message 1326 may be implemented as a cloud platform application, such as a Google Pub/Sub application, which is configured to transmit a publish-subscribe message.

A subscribe stage 1330 depicts functions to implement subscriber processing functions to receive and process a publish-subscribe message. Trigger function 1332 may be configured to schedule operation of function 1334, which, when activated, can receive data associated with a publish-subscribe message. Process message 1336 may be implemented as a cloud platform application, such as a cloud function application, which may be configured to execute instructions to process data in relation to a received publish-subscribe message.

An output stage 1340 depicts functions to store outputs generated at process message 1336. As shown, function 1342, which may be implemented as a cloud platform function, can be configured to generate one or more output files in, for example, a CSV format (or any other format) for storage in queue 1344. For example, CSV-formatted files may be generated to include three files for video channels, playlists, and video metadata, or any other data.

A storage stage 1350 depicts a function to store data from output stage 1340 in a data warehouse. For example, load data warehouse 1352 may be configured to load data from a cloud platform storage in output stage 1340 in data lake or a data warehouse, whereby the loaded data may be accessed to generate reports, predict brand intelligence parameters, and other functions.

FIG. 14 depicts an example of a system architecture to provide a computing platform to host an application to analyze electronic messages including data associated with distributed data files in a distributed computing system, according to an example. Data constituting executable instructions (e.g., remote applications) and other content, such as text, video, audio, etc. may be stored in (or exchanged with) various communication channels or storage devices. For example, various units of content may be stored using one or more of a web application 1424 (e.g., a public data source, such as a new aggregation web site), an email application service 1426, an electronic messaging application 1428 (e.g., a texting or messenger application), social networking services 1430 and a services platform and repository 1432 (e.g., cloud computing services provided by Google® cloud platform, an AWS® directory service provided by Amazon Web Services, Inc., or any other platform service). A server 1415 may implement a cross-stream data processor application 1450 to correlate event data over multiple data streams, classify distributed data at multiple data sources, and modify the distributed data as a function of compatibility. As an example, server 1415 may be a web server providing the applications 1450 and 1452 via networks 1410. As an example, a client computing device may be implemented and/or embodied in a computer device 1405, a mobile computing device 1406 (e.g., a smart phone), a wearable computing device 1407, or other computing device. Any of these client computing devices 1405 to 1407 may be configured to transmit content (e.g., as electronic text or documents, video content, audio content, or the like) from the store 1416, and may be configured to receive content (e.g., other electronic content).

Figure 15:
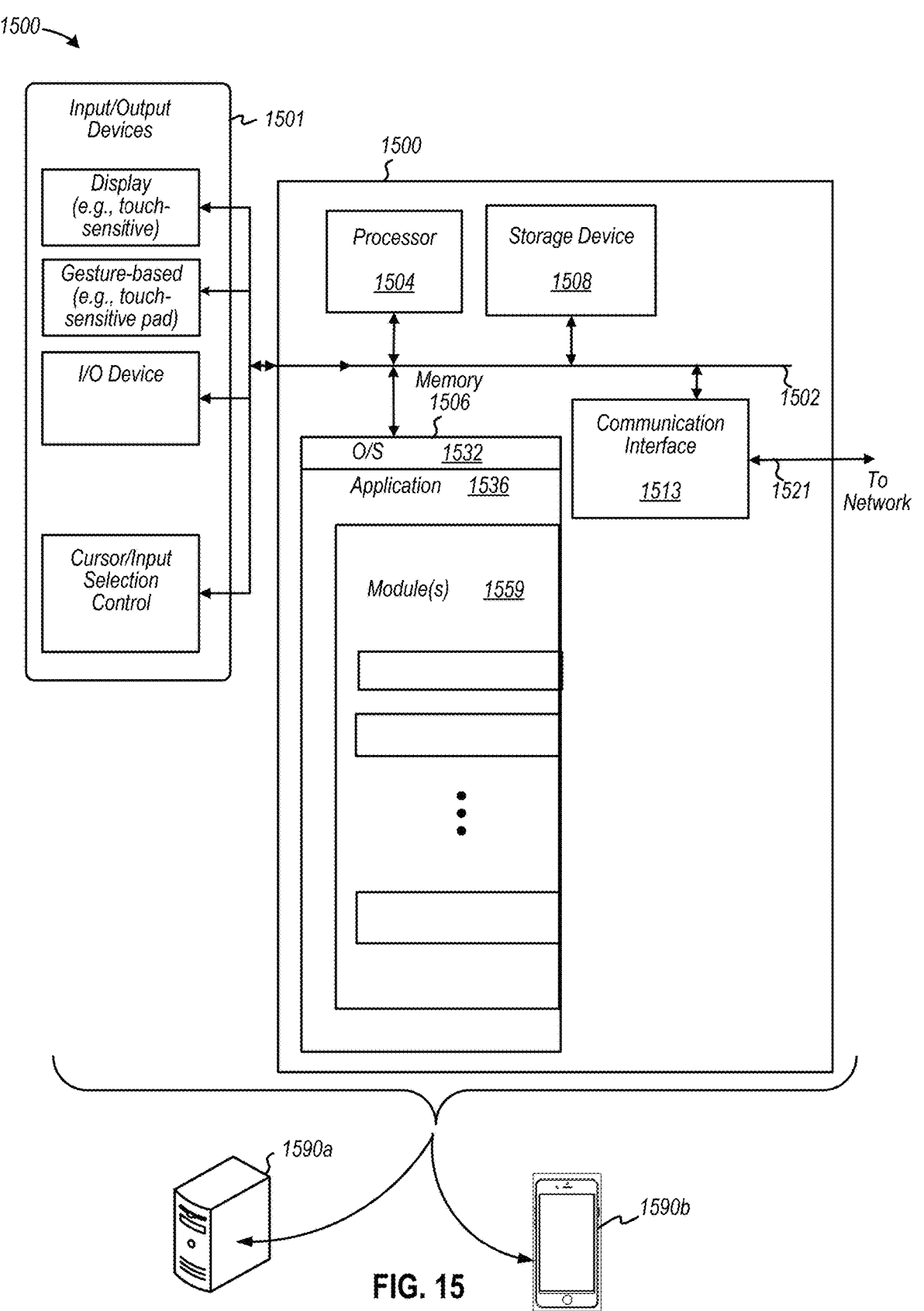
FIG. 15 illustrates examples of various computing platforms configured to provide various functionalities to components of an electronic message platform, according to some examples.

FIG. 15 illustrates examples of various computing platforms configured to provide various functionalities to components of an electronic message platform 1500 configured to analyze electronic message data, correlate event data over multiple data streams, classify distributed data received in the analyze electronic message, and modify the distributed data as a function of compatibility. Computing platform 1500 may be used to implement computer programs, applications, methods, processes, algorithms, or other software, as well as any hardware implementation thereof, to perform the above-described techniques.

In some cases, computing platform 1500 or any portion (e.g., any structural or functional portion) can be disposed in any device, such as a computing device 1590$a$, mobile computing device 1590$b$, and/or a processing circuit in association with initiating any of the functionalities described herein, via user interfaces and user interface elements, according to various examples.

Computing platform 1500 includes a bus 1502 or other communication mechanism for communicating information, which interconnects subsystems and devices, such as processor 1504, system memory 1506 (e.g., RAM, etc.), storage device 1508 (e.g., ROM, etc.), an in-memory cache (which may be implemented in RAM 1506 or other portions of computing platform 1500), a communication interface 1513 (e.g., an Ethernet or wireless controller, a Bluetooth controller, NFC logic, etc.) to facilitate communications via a port on communication link 1521 to communicate, for example, with a computing device, including mobile computing and/or communication devices with processors, including database devices (e.g., storage devices configured to store atomized datasets, including, but not limited to triplestores, etc.). Processor 1504 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1500 exchanges data representing inputs and outputs via input-and-output devices 1501, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1501 may be implemented as, or otherwise substituted with, a user interface in a computing device associated with, for example, a user account identifier in accordance with the various examples described herein.

According to some examples, computing platform 1500 performs specific operations by processor 1504 executing one or more sequences of one or more instructions stored in system memory 1506, and computing platform 1500 can be implemented in a client-server arrangement, peer-to-peer arrangement, or as any mobile computing device, including smart phones and the like. Such instructions or data may be read into system memory 1506 from another computer readable medium, such as storage device 1508. In some examples, hard-wired circuitry may be used in place of or in combination with software instructions for implementation. Instructions may be embedded in software or firmware. The term "computer readable medium" refers to any tangible medium that participates in providing instructions to processor 1504 for execution. Such a medium may take many forms, including but not limited to, non-volatile media and volatile media. Non-volatile media includes, for example, optical or magnetic disks and the like. Volatile media includes dynamic memory, such as system memory 1506.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1502 for transmitting a computer data signal.

In some examples, execution of the sequences of instructions may be performed by computing platform 1500. According to some examples, computing platform 1500 can be coupled by communication link 1521 (e.g., a wired network, such as LAN, PSTN, or any wireless network, including WiFi of various standards and protocols, Bluetooth®, NFC, Zig-Bec, etc.) to any other processor to perform the sequence of instructions in coordination with (or asynchronous to) one another. Computing platform 1500 may transmit and receive messages, data, and instructions, including program code (e.g., application code) through communication link 1521 and communication interface 1513. Received program code may be executed by processor 1504 as it is received, and/or stored in memory 1506 or other non-volatile storage for later execution.

In the example shown, system memory 1506 can include various modules that include executable instructions to implement functionalities described herein. System memory 1506 may include an operating system ("O/S") 1532, as well as an application 1536 and/or logic module(s) 1559. In the example shown in FIG. 15, system memory 1506 may include any number of modules 1559, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1559 of FIG. 15, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1559 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1559 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1559 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

Figure 16:
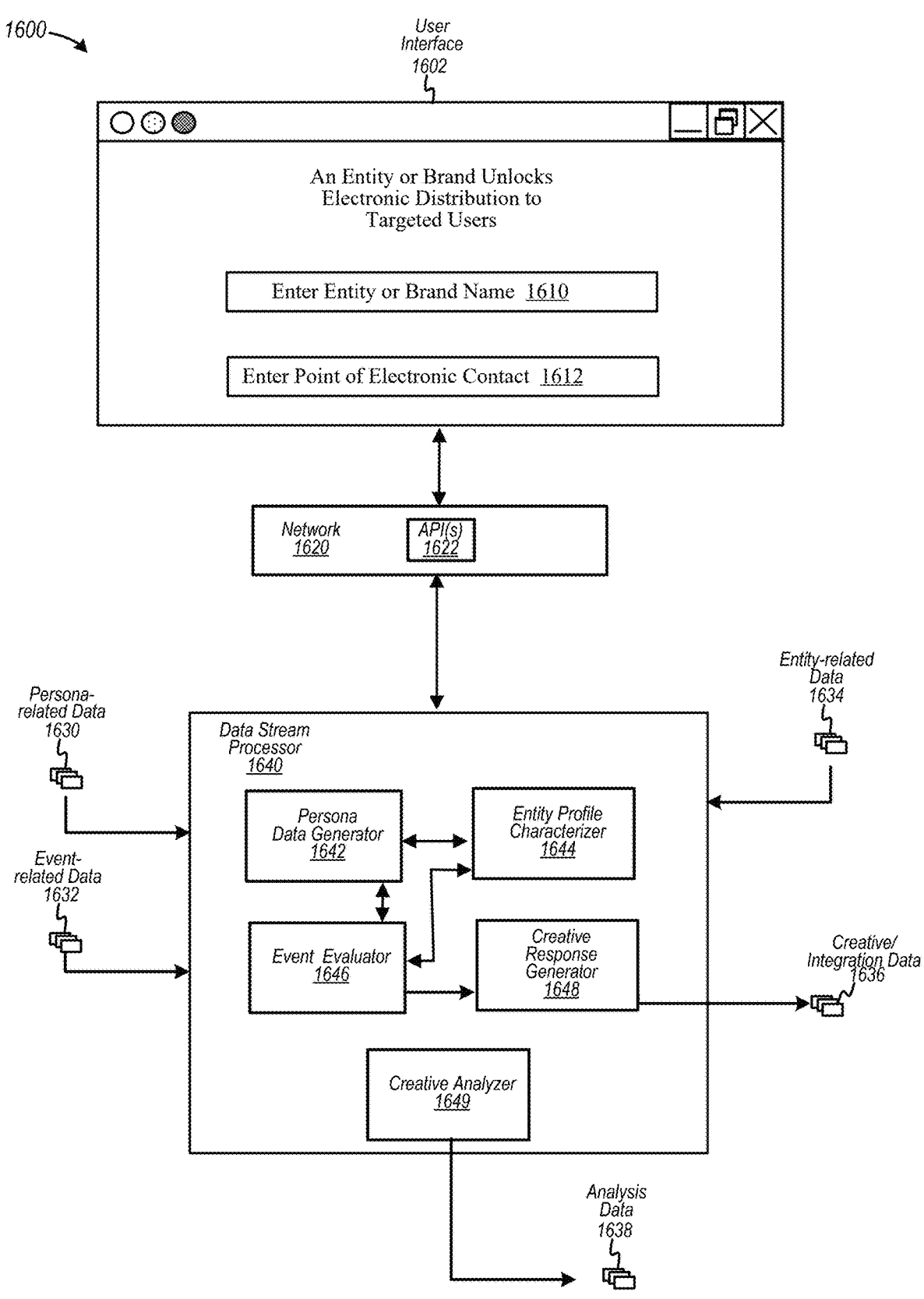
FIG. 16 is an example of a data stream processor configured to analyze streams of data from various data sources and to adapt electronic messages in accordance with attributes of an entity, attributes of target computing devices, and data representing temporal events, at least in some embodiments.

FIG. 16 is an example of a data stream processor configured to analyze streams of data from various data sources and to adapt electronic messages in accordance with attributes of an entity, attributes of target computing devices, and data representing temporal events, at least in some embodiments.

Diagram 1600 depicts a data stream processor 1640 configured to adapt electronic messages in accordance with attributes of an entity, attributes of target computing devices, and data representing temporal events. Data stream processor 1640 may be configured to automatically facilitate identification of attributes of an entity (e.g., a "brand") providing goods or services correlated with attributes of targeted computing devices associated with users (e.g., attributes associated with one or more personas). In some examples, data stream processor 1640 may be configured to adapt integration data as a function of data representing an entity targeted to computing devices associated with a subset of users in view of environmental factors (e.g., events or moments that may affect adaptation of the integrated data). In some examples, integration data may include data configured to modify distributed data to convey information targeted as, for example, an advertisement or other information generated and adapted to conform with a computing platform configured to integrate the modified distributed data into, for example, a social media platform. Data stream processor 1640 may be configured to automatically generate and distribute integration data in real-time (or near real-time) based on events or moments, thereby providing temporally optimized information to users of computing devices.

As shown in diagram 1600, data stream processor 1640 may include a persona data generator 1642, an entity profile characterizer 1644, an event evaluator 1646, a creative response generator 1648, and a creative analyzer 1649 configured to generate analysis data 1638. Data stream processor 1640 may be configured to receive via a user interface 1602 data representing an entity (or brand) 1610 and a point of contact 1612, such as a website or a uniform resource locator ("URL") associated with an entity or brand. Data associated with entity 1610 and electronic contact data 1612 may be provided via one or more application programming interfaces ("APIs") 1622 through any type of network 1620 (e.g., the Internet).

Persona data generator 1642 may be configured to classify attributes of users of computing devices to form data representing a persona. For example, persona data generator 1642 may be configured to classify subsets of users that might be associated with American football in view of coach Jim Harbaugh and associated football teams with which he has had success, such as at Stanford University, the 49er™ NFL team, and the University of Michigan's National Title, as well as any other football related activities. As another example, persona data generator 1642 may be configured to classify subsets of users that may be tennis enthusiasts that follow social media relating to tennis superstars Serena Williams, Naomi Osaka, and Novak Djokovic, as well as any tennis tournaments including the French Open or any other tennis-related activities. In some examples, persona data generator 1642 may be configured to receive persona-related data 1630 to generate classifications of personas. In some cases, persona-related data 1630 may be extracted from distributed data sources, such as extracting or "scraping" information that is publicly accessible via network 1620. Persona data generator 1642 may include logic configured to apply persona-related data 1630 to a large language model ("LLM") to identify a subset of users that may be associated with an entity (or brand) in accordance with an entity profile (e.g., brand profile data of FIG. 11) as well as event-related data 1632 (e.g., event state data of FIGS. 3, 6, 9, and 11, etc.).

Entity profile characterizer 1644 may be configured to characterize an entity (e.g., a brand) to derive attributes of an entity with which to correlate with subsets of data representing persona data. Entity profile characterizer 1644 is configured to generate profile data representing an entity such as data extracted based on electronic contact data 1612, which may include entity-related data 1634 representing a mission and aims (e.g., values) of an entity. For example, entity profile characterizer 1644 may access entity-related data 1634 to identify attributes of an entity (or brand), whereby entity-related data 1634 may include data describing in natural language profile characteristics relating to a product or service, social causes aligned with the entity, aspirational entities aligned with the aims of an entity, and the like. Entity profile characterizer 1644 may include logic configured to apply entity-related data 1634 to a large language model ("LLM") to identify a subset of users that may be associated with an entity (or brand) in accordance with an entity profile (e.g., brand profile data of FIG. 11).

Event evaluator 1646 is configured to receive event-related data 1632 describing environmental factors including data associated with events or moments that may affect adaptation of the integrated data for insertion as integrated data into a distributed data source, such as social media computing platform. Event evaluator 1646 may be configured to access data from distributed data sources to identify data representing an environment in which modified distributed data may be inserted in context of the environment. In at least one example, event evaluator 1646 may receive event-related data 1632 (e.g., event state data of FIGS. 3, 6, 9, and 11, etc.). For example, event-related data 1632 may describe news-related events, political events, sporting events, social upheaval events, celebrity views or commentary, and other information that may affect adaptation of integrated data, such as an advertisement, into a distributed data source (e.g., a social media website). In some examples, event evaluator 1646 may be configured to generate moment data responsive to (or filtered by) persona data generated by persona data generator 1642 describing classifications of users and/or data generated by entity profile characterizer 1644 describing attributes of an entity.

In some examples, event evaluator 1646 may be configured to filter a subset of events to form moment data with which to filter integration data as function of an entity's targeted computing devices depending on whether, for example, an entity requires data to be favorable to a brand (e.g., leans in), or whether an entity requires non-favorable data (e.g., leans out) to be excluded for incorporation as integration data. In some cases, some targeted computing devices may be viewed as neutral in view of data representing an entity's goals or aims to enhance diffusivity.

Creative response generator 1648 may be configured to automatically generate content or data to be integrated as creative/integrated data 1636 into a distributed data source, such as a website. Creative response generator 1648 may include logic including natural language processors ("NLPs") and computer vision algorithms (e.g., convolutional neural networks, or "CNN") to automatically generate data as integrated data, as well as a large language model ("LLM") or a visual language model ("VLM") capable of interpreting and generating images or text, or both, associated with one or more inputs based on persona data, entity data (e.g., brand data), or event data, or any combination thereof. For example, creative response generator 1648 may be configured to automatically generate creative/integration data 1636, such as an electronic advertisement, to include predictive text and predictive imagery (e.g., video data) in real-time (or near real-time) based on one or more of persona data, entity data, and event data. Therefore, creative response generator 1648 may be configured to receive text or image data with which to generate integration data, such as an advertisement. Generated integration data may encapsulate data derived as predictive text and images as suitable for a distributed data source (e.g., a social media platform) based on based on persona data, entity data, or event data. For example, integration data may be generated to provide information on a good or service in context of a political event, such as aggression in a foreign country and whether a brand or a targeted audience of consumers might embrace the integration data given the context.

Creative analyzer 1649 includes logic that may be configured to analyze data associated with creative/integrated data 1636 as well as persona data, entity data, or event data to determine performance of data stream processor 1640 and to generate analysis data 1638. Creative analyzer 1649 may be configured to predictively or statistically (e.g., using deep learning neural networks or LLMs) correlate persona data, entity data, or event data with integration data based on, for example, a rate of diffusivity that may refer to a rate of propagation of electronic messages including integration data in accordance with event-related data 1632 (or moment data) across multiple data sources during an interval of time. The rate of propagation may be determined, at least in part, by extracting an amount of feature data associated with an event within a time interval. As described herein, feature data (e.g., units of data) may be used by data stream processor 1640 to detect patterns of data that may be used to constitute an event (or a moment). In some examples, feature data may include units of text (e.g., words or tokens), units of image data (e.g., an amount of pixels, or matched image data), units of audio data, and the like. Therefore, creative analyzer 1649 may be configured to generate data representing reports describing audience identification (e.g., determining and categorizing target demographics for a product or service to align with aims of an entity or brand), and data representing degrees of effectiveness of integration data (e.g., as electronic advertisements) that may be received by targeted users. A computing device associated with an entity or brand may be configured to receive analysis data 1638 and may be further configured to modify the form or format of the automatically generated integration to aptly conform with persona data, entity data, or event data.

Data stream processor 1640 may include any logic configured to implement a large language model ("LLM") or other generative artificial intelligence algorithms, such as any AI models implemented to perform the functionalities described in FIG. 16 or herein, such as generative artificial intelligence ("generative AI") with natural language, generative pre-trained transformers ("GPT")™, machine-learning neural networks, deep learning neural networks, and equivalents thereof. An LLM may be implemented using one or more LLMs, such as Llama™ (Large Language Model Meta AI) maintained by Meta AI, which is a subsidiary of Meta Platforms, Inc. d/b/a Meta of Menlo Park, CA. An LLM may be implemented using GPT-3 or GPT-4, or variants thereof, which are maintained by OpenAI™ of San Francisco, CA. An LLM may be implemented using one or more of Gemini™ LLMs, which are maintained by Google DeepMind™ as a subsidiary of Alphabet, Inc. of Mountain View, CA. An LLM may be implemented using an Azure OpenAI™ LLM (or other LLMs) maintained by Microsoft, Inc., of Redmond WA. An LLM may be implemented using one or more of LLMs developed by Cohere™ of Toronto, Ontario. An LLM may be implemented using a wide variety of LLMs, such as Hugging Face™ (e.g., using Flan-T5-XXL or variants, GPT-NeoXT-Chat-Base-20B or variants, ChatGLM-6b or variants, etc.) with or without Lang-Chain™. Further, any implementation of an LLM may be configured to operate in accordance with retrieval-augmented generation ("RAG") algorithmic techniques.

One or more functional blocks in diagram 1600 may be implemented as, or may be associated with, software, applications, executable code, endpoints, or application programming interfaces ("APIs"), processors, hardware, firmware, circuitry, or any combination thereof.

FIG. 17 is a diagram depicting an example of a flow to autonomously generate integration data for integration into a distributed data source, according to some examples. Diagram 1700 depicts a flow at 1702 at which a user interface is generated to receive data representing an entity. In some examples, data associated with an entity includes data representing an organization or brand data associated with a product or service.

At 1704, data representing a subset of users associated with an entity may be identified or predicted. In some examples, a subset of user may be associated with persona data configured to characterize attributes of users associated with a target audience predicted to receive information, such as integration data (e.g., a targeted advertisement), for consumption by targeted users. Persona data may include one or more persona classifications.

At 1706, data representing profile characteristics of an entity with which to correlate with a subset of users may be received. In some cases, characteristics of an entity may be profiled to include data representing objectives of an entity, organization, or a brand. Data representing objectives of an entity may be expressed in natural language as a mission statement as well as value or aims of an entity, any of which may be derived by analyzing website data using logic configured to implement a large language model ("LLM") or other generative artificial intelligence algorithms, such as any AI models.

At 1708, data representing an event associated with a subset of data representing a subset of users (e.g., based on persona data) may be generated. An event or a subset of events may be filtered by an anticipation board template application configured to generate moment data defining a subset of events. An anticipation board template application may include logic configured to receive natural language inputs, such as 'inclusive' and 'multicultural beauty' to filter general event data such as news-related events, political events, sporting events, social upheaval events, celebrity views or commentary to determine 'moment data' including event data relevant to the natural language inputs. In some cases, inputs into an anticipation board template application may be a prompt to an LLM, or any equivalent algorithm including executable instructions configured to perform, for example, a vector similarity search ("VSS") to match natural language inputs against data received via a network that may describe relevant event data.

At 1710, content data may be generated to integrate with a data file associated with a platform hosting distributed data. The content data or integration data may be derived as a function of persona data and entity data (e.g., brand data). In some examples, content data or integration data may be derived using an LLM to predict text and/or predict imagery (e.g., video data) in real-time (or near real-time) based on persona data, entity data, or event data, whereby the content data or integration data may be integrated with a distributed data source, such as a social media platform, to provide information (e.g., advertisements) in real time (or near real time).

Figure 18:
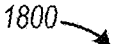
FIG. 18 is an illustration depicting an example of a persona generator configured to classify subsets of users and targeted computing devices, according to some embodiments.

FIG. 18 is an illustration depicting an example of a persona generator configured to classify subsets of users and targeted computing devices, according to some embodiments. Diagram 1800 includes a persona generator 1830 configured to generate persona classification data that may describe subsets of users and targeted computing devices based on attributes, such as demographics, inclination to receive certain information or content regarding a brand (e.g., a product or service), as well as other attributes. In some examples, persona classification data may include an identifier or name of a persona (e.g., "a tennis enthusiast"), a symbolic representation of a persona (e.g., an emoji symbol that encapsulates the essence of the persona) or image data representing a type of user or person for which the persona classification data represents. An image may be captured based on computer vision-derived features or autonomously generated by generative AI algorithms. Persona classification data may also include data representing a textual and/or an image description of a persona as a classification of subsets of users (as a targeted audience), whereby description data may describe an essence, characteristic, and relevant details associated with a persona. For example, persona classification data may describe a subset of users in natural language as "young professionals committed to latest technology trends and may be inclined to learn about new technological opportunities."

Persona classification data may include data describing an age range of users, a gender (in whichever category), parental status (e.g., whether a persona classification is associated with having children or not), a predicted household income range associated with a persona classification, as well as keywords or identifiers (e.g., #hashtags) related to a subset of users matching a persona classification. Persona classification data may be expressed in text or natural language to determine targeting parameters to customize integration data (e.g., text and/or image advertisements) to any specific computing platform hosting distributed data, such as Facebook®, Tik Tok™, YouTube®, as well as any other computing platforms.

Diagram 1800 includes a context data generator 1820 configured to receive data and generate contextual data to, for example, be applied to persona generator 1830, which may include any logic configured to implement a large language model ("LLM") or other generative artificial intelligence algorithms, such as any AI models. As shown, context data generator 1820 may receive persona data 1810, which may include a number or a subset of persona classifications for an entity or brand. Entity data 1812 may include data related to an entity or a good or service (e.g., a brand). For example, entity data 1812 may include data representing an entity of describing associated goods or services constituting a "brand." Entity communication link data 1814 may include an electronic point of contact, such as a link to a website, such as a URL, or any other electronic point of contact, such as a telephone number. Diagram 1800 may include logic configured to generate entity communication data 1815 as summaries of an entity website that may include descriptions of an entity (e.g., a brand) in natural language for application as an embedding to a vector database and/or an LLM. Context data generator 1820 may also be configured to receive entity profile data 1816 describing attributes of an entity, such as data representing a mission, values, or an objective of an entity. In some cases, a computing platform as described herein may be configured to extract data via a network (e.g., 'scrape' website data) to formulate entity profile data 1816. In view of the foregoing, context data generator 1820 may include logic configured to generate data (e.g., in natural language) to apply to a vector database 1840 or an LLM 1844. In at least one case, context data generator 1820 may be configured to autonomously generate a 'prompt' for application to vector database 1840 or an LLM 1844.

Persona generator 1830 may include a persona characterization engine 1836 configured to receive data from a persona descriptive generator 1832 and a persona image generator 1834. In some examples, persona generator 1830 may include hardware or software, or a combination thereof, configured to generate targeting parameters (e.g., in natural language) as data to be applied to vector database 1840, whereby data representing targeting parameters may be filtered to align with a subset of users or an audience aligned with an entity or brand. Persona descriptive generator 1832 may be configured to generate text or alphanumeric symbols that describe an entity, including the above-described textual attributes of a persona or persona classification data.

Persona image generator 1834 is configured to analyze image data and to extract data and information relevant to generate data for application against vector database 1840 to search LLM 1844. Persona image generator 1834 may include an algorithm to receive imagery or video to determine characteristics of a persona, whereby the characteristics may be represented as text or labels describing aspects of an image. For example, persona image generator 1834 may be configured to estimate an age and gender from image data as an example of one or more persona classes using, in some instances, convolutional neural networks, or "CNN" algorithms. Further, persona image generator 1834 may be configured to detect emotions (e.g., as conveyed on facial expression of a video, etc.), to track objects such as persons or things in a video, and to identify interactions amongst objects of a video stream. Persona image generator may also be configured to extract audio data to identify persona classification data. Persona image generator 1834 may be configured to analyze imagery or may be configured to generate via generative AI imagery that may be adaptable for inclusion in a distributed data source (e.g., a social media computing platform). For example, persona image generator 1834 may be configurable to generate autonomously a video advertisement for inclusion in a data stream, such as a data stream associated with YouTube™.

Persona characterization engine 1836 may be configured to receive descriptive data from persona descriptive generator 1832 and data from persona image generator 1834 to generate data to be applied to vector database 1840, which may store semantic vector embeddings as numeric values that serve to index content of proprietary and non-proprietary knowledge sources associated with an entity or a brand. Vector database 1840 may be also configured to receive platform selection data 1818 to adjust outputs of LLM 1844 (e.g., as prompt data) based on targeted platforms and data protocols. Platform selection data 1818 may identify a distributed data source configured to host integration data, such as Facebook®, YouTube®, Twitter or X™, and other computing platforms. Vector database 1840 may be implemented in connection with an LLM as well as natural language processing ("NLP") algorithms or any neural network-based algorithm including deep learning or machine learning algorithms.

Large language model ("LLM") 1844 may include one or more machine or deep learning based neural network algorithms that may be configured to receive data representing target parameters as persona parameters 1842 and operate in accordance with data configured to classify subsets of data as persona classification data to generate persona data output 1850, which may be configured to drive generation of integration data (e.g., advertisement data) to update software or applications hosting distributed data, such as a social media computing platform. As an example, LLM 1844 may be used to determine a description and demographics of a subset of users as "a persona," such as a grouping of personas based on descriptions, demographics, interests, behavioral habits, active interests, as well as terms (e.g., searchable hashtags).

Figure 19:
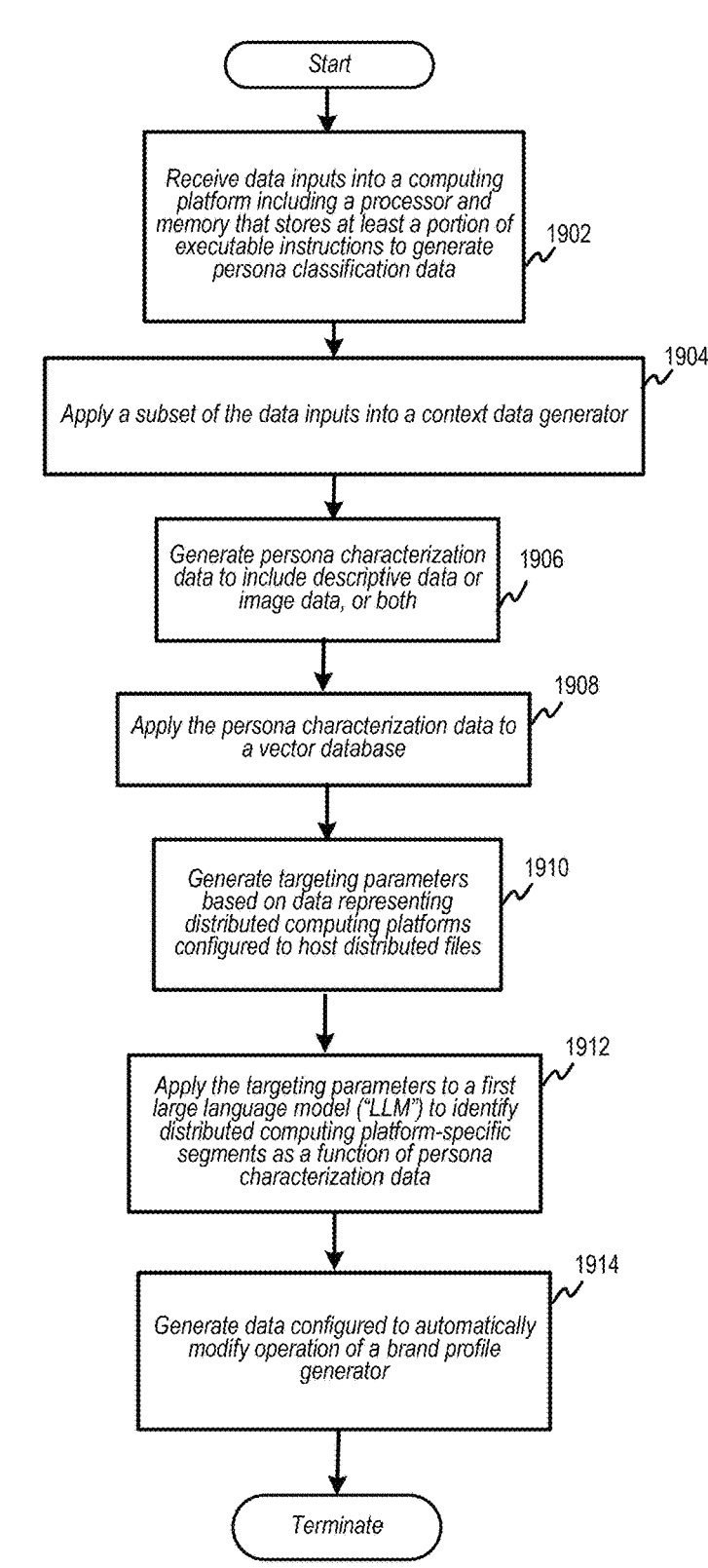
FIG. 19 is a diagram depicting an example of a flow to autonomously generate persona data with which to target characteristics of a subset of users, according to some examples.

FIG. 19 is a diagram depicting an example of a flow to autonomously generate persona data with which to target characteristics of a subset of users, according to some examples. Diagram 1900 depicts a flow at 1902 at which a user interface associated with a processor and memory is generated to receive data representing an entity. In some examples, data associated with an entity includes data representing an organization or brand data associated with a product or service. At 1904, a subset of data inputs may be applied to a context data generator to generate contextual data based on, for example, persona data and entity-related data. As an example, a subset of data may include entity data, entity communication link data, such as a URL, and entity profile data.

At 1906, persona characterization data may be generated to include descriptive data (e.g., classifying a persona) or image data (e.g., from which to classify a persona), or both. At 1908, persona characterization data may be applied to a vector database using data representing targeting parameters to identify classifications of groupings of users or computing devices as targeted audiences of content that may have access to content hosted on distributed computing platforms, such a social media platform. At 1910, targeting parameters may be generated to identify or format data for placement or integration in hosted distributed data files.

At 1912, targeting parameters may be applied to a large language model ("LLM") or any data model, including NLP data models, to identify distributed computing-specific segments as a function of persona characterization data. For example, data derived from an LLM may target a distributed computing platform, such as LinkedIn®, Facebook®, Twitter™ or X™, YouTube®, or the like. In some examples, targeting parameters may be configured as "prompts" in natural language for input into an LLM. At 1914, data configured to automatically or autonomously modify operation of a brand profile generator may be generated, whereby the brand profile generator may include logic to provide data regarding an entity or brand as a function of derived persona data.

Figure 20:
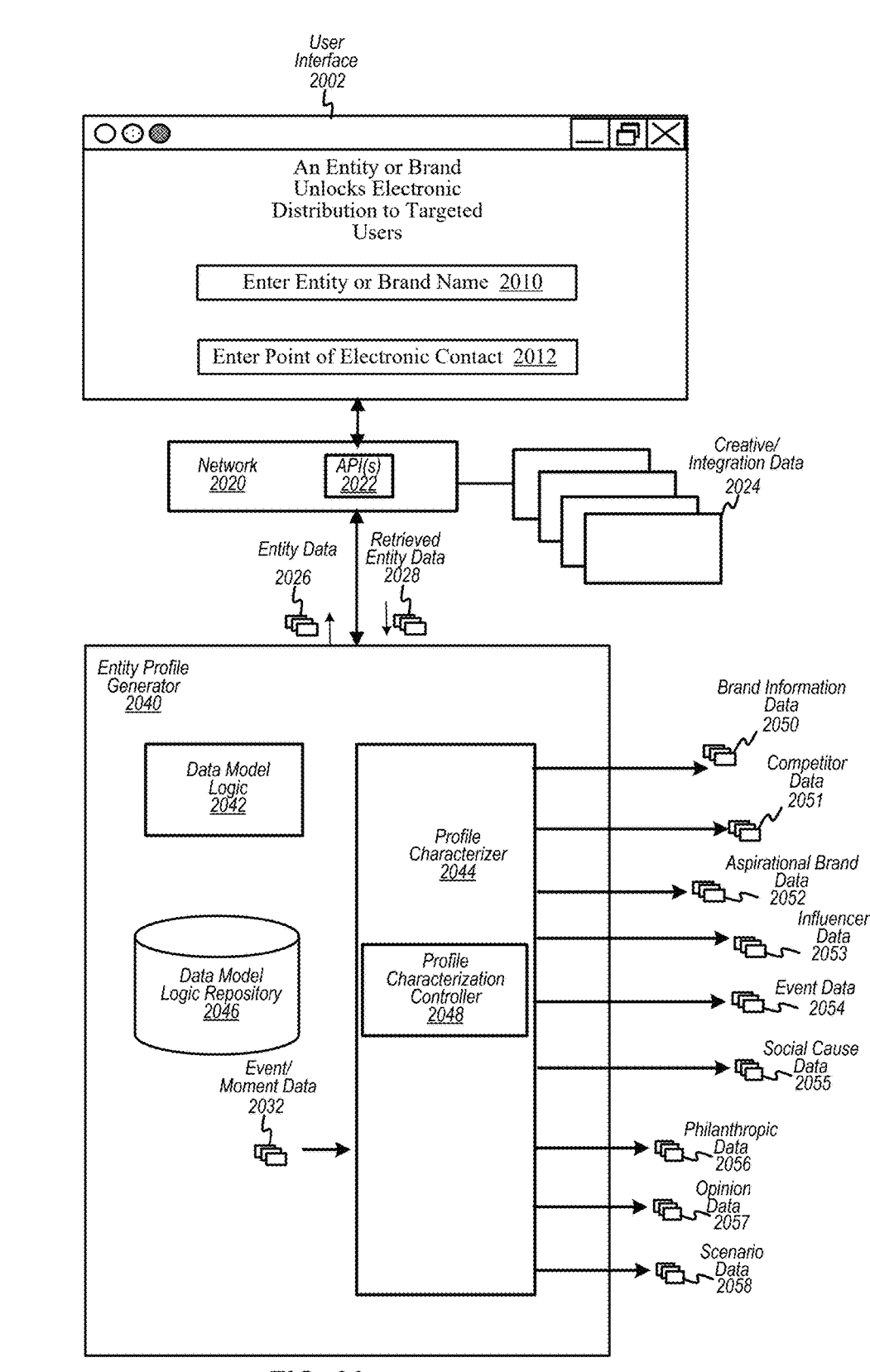
FIG. 20 depicts an example of an entity profile generator according to some examples.

FIG. 20 depicts an example of an entity profile generator according to some examples. Entity profile generator 2040 may include logic, such as data model logic 2042, configured to characterize an entity or a brand (e.g., goods or services) to generate a profile describing characteristics of a brand with which to match against or identify persona classification data defining a subset of users (e.g., a target audience of consumers). In some examples, data model logic 2042 may include a large language model ("LLM") or any other machine learning or deep learning algorithm or data model, such as a neural network data model. Entity profile generator 2040 may be configured to determine which subset of distributed data sources (e.g., social media computing platforms) have a degree of compatibility to generate integration data for insertion as a target data file in a computing platform hosting compatible content.

Entity profile generator 2040 may be configured to receive via a user interface 2002 data representing an entity (or brand) 2010 and a point of contact 2012, such as a website or a uniform resource locator ("URL") associated with an entity or brand. Data associated with entity 2010 and electronic contact data 2012 may be provided via one or more application programming interfaces ("APIs") 2022 through any type of network 2020 (e.g., the Internet). In some examples, data model logic 2042 may include hardware or software, or both, configured to accept data representing an entity (or brand) 2010 and a point of contact 2012 to generate entity data 2026 configured to access distributed data sources to identify or "scrape" available data as retrieved entity data 2028 describing an entity, such as data representing an entity or brand (e.g., names of products or services), alternative points of contact (e.g., data representing a Twitter or X™ handle, an Instagram™ handle, a YouTube™ handle or website, etc.), a mission statement of an entity, a vision statement of an entity, a value statement of an entity, and other brand-related data, any of which may be stored in data model logic repository 2046 (e.g., linked to taxonomy labels for searching and profile characterization purposes). In some examples, data model logic 2042 may implement an LLM configured to implement retrieved entity data 2028 to generate data in natural language (or text) describing a mission statement, a vision statement, a value statement, or the like to characterize or profile an entity or brand, as well as "industry vertical" data describing an economic or type of industry classification.

Entity profile generator 2040 may be configured to implement data model logic 2042 to facilitate operation of logic of a profile characterizer 2044 in at least some cases. Profile characterizer 2044 is shown to include a profile characterization controller 2048 configured to generate profile characterization data 2050 to 2058, among other profile characterization data. In some examples, entity profile generator 2040 may include logic to generate or agent programs that accepts and transmits data in natural language, such as a natural language "chatbot," which may be used to interoperate with the above-described data model logic 2042. An example of a chatbot may include ChatGPT™ of OpenAI™ of San Francisco, CA, as well as others.

In one example, profile characterization controller 2048 may be configured to determine brand information data 2050 including a "website_url" as (www.) cajunbeefburgers4you.com associated with industry vertical data representing "Food, Beverage and Tobacco." Brand information data 2050 may also include a Twitter or X handle as a point of contact, such as "@cajunbeefburgers4you." Brand information data 2050 may also include "key_terms" such as data describing "Cajunbeefburgers4you, fast food, sports, environmentally friendly," data representing a mission statement "to deliver superior quality products and services for our customers and communities through leadership, innovation and partnerships," data representing a value statement "Cajunbeefburgers4you' core values, including 'Quality is our Recipe,' 'Do the Right Thing,' and 'Give Something Back'" based on a founder's dedication to a good or service constituting a brand." Brand information data 2050 may include data representing a vision statement such as "Our vision is aimed at higher quality, fresh, wholesome food . . . prepared when you order it . . . prepared by Cajunbeefburgers4you's kind of people . . . we don't cut corners."

Profile characterization controller 2048 and data model logic 2042 may be configured to identify likely competitor data 2051 using competitor data stored in data model logic repository 2046 or that is publicly accessible. Further to the example, competitor data 2051 may include information describing competitors (e.g., other hamburger goods and services) related to Cajunbeefburgers4you. Also, profile characterization controller 2048 and data model logic 2042 may be configured to identify other entities that may not be classified as an associated industry vertical, but may share similar values or aims of brand, whereby data representing the other entities may be characterized as aspiration brand data 2052. For example, a clothing manufacturer may assert similar mission statements and values as the brand Cajunbeefburgers4you. Therefore, a brand, such as Cajunbeefburgers4you, may align with distributed data sources hosting advertisements for a clothing manufacturer, or may avoid generating integration data (e.g., an electronic advertisement) for associated distributed data sources that may not align with the mission or values of a brand.

Profile characterization controller 2048 and data model logic 2042 may be configured to identify likely influencer data 2053 that may represent individuals or celebrities that may align with a brand's mission, values, or targeted audience. For example, if George Washington had a strong following on a social media platform, a brand sharing George Washington's values and persona may be configured to promote integration data to enhance diffusivity (e.g., increase virality or a viral propagation of electronic messages of an ad campaign) to expose a brand diffusely among George Washington's followers through one or more social media platforms.

Profile characterization controller 2048 and data model logic 2042 may be configured to monitor defined event data 2054. For example, event-related data 2054 may describe news-related events, political events, sporting events, social upheaval events, celebrity views or commentary, and other information that may affect adaptation of integrated data, such as an advertisement, into a distributed data source (e.g., a social media website). Event-related data 2054 may include data representing a "hamburger national weekend" or a restaurant conference in which restauranters may convene to learn more about their businesses.

Profile characterization controller 2048 and data model logic 2042 may be configured to monitor data representing social cause data 2055 and philanthropic data 2056 so as to promote a brand aligned with social causes or philanthropic aims of an entity or organization. For example, a brand may desire to be associated with "sustainable or environmentally-friendly" practices, minimum wage law improvements, animal welfare, and the like. Thus, integration data, such as an advertisement, may be generated for insertion in a distributed data source promoting aligned social causes or philanthropic aims.

Profile characterization controller 2048 and data model logic 2042 may be configured to monitor data representing opinion data 2057 configured to direct generation of the form of integration data as well as targeted distributed data sources. For example, opinion data 2057 may include data representing an opinion (e.g., agree, disagree, or neutral as affinity data) whether to promote a brand in association with a distributed data source. Examples of opinion data 2057 may express agreement, disagreement, or neutrality regarding distributed data sources or social media computing platforms promoting "alcohol," "hip hop music," "tobacco," "parenting of children," "humor," and other profile data that a brand may wish to be associated.

Profile characterization controller 2048 and data model logic 2042 may be configured to monitor data representing scenario data 2058 configured to direct generation of the form of integration data as well as targeted distributed data sources. For example, scenario data 2058 may include data representing natural language expressions of scenarios that may be in agreement (e.g., prefer an association) with a brand, in disagreement (e.g., avoid association) with a brand, or neutral (e.g., monitor a distributed data source) regarding a brand. Examples of scenarios include "a business recalls products," "a business experiences a worker strike," "a business delays launch of a product," and the like. According to some examples, profile characterization controller 2048 may receive event/moment data 2032 that includes data configured to filter data 2050 to 2058 as a function as to whether an entity or a brand may filter out distributed data sources or social media computing platforms based on agreement or alignment to a brand, a disagreement or non-alignment to a brand, or a neutral or "monitoring" position.

In some examples, entity profile generator 2040 may be configured to generate data 2050 to 2058 and store the data in data model logic repository 2046 constituting a "brand profile" with which to match against persona classification data. Data 2050 to 2058 may be generated automatically or autonomously using an LLM, and in some cases, may be supplemented with user inputs. For example, user interface 2002 may be configured to present an owner of a good or service with a subset of queries to refine generation of a brand profile (not shown). Data model logic 2042 may be configured to implement an LLM to generate a subset of queries that a brand owner may review to modify any of brand information data 2050, competitor data 2051, influencer data 2053, event data 2054, social cause data 2055, philanthropic data 2056, opinion data 2057, and scenario data 2058. Data 2050 to 2058 each may be considered a class of a brand entity profile data.

FIG. 21 is a diagram depicting an example of a flow to autonomously generate brand profile data with which to generate a set of data describing aspects of a good or service, according to some examples. Diagram 2100 depicts a flow that at 2102 a user interface associated with a processor and memory is configured to transmit entity data (e.g., relating to goods or services, or one or more brand names) from a computing platform that includes a processor and memory, whereby the memory may store at least a portion of executable instructions to generate entity profile data. In some examples, transmitting entity data may include first transmitting a name of an entity associated with a good or service, and second, transmitting a webpage link, or URL. At 2104, an application program interface ("API") may be configured to receive electronic messages including retrieved entity data.

At 2106, retrieved entity data may be received into data model logic, the retrieved entity data being associated with an entity for which the entity profile data is characterized. In some examples, data model logic may include a machine learning neural network or a deep-learning neural network, as well as a data model logic including a large language model ("LLM").

At 2108, a data model logic repository may be accessed, in some examples, to identify profile characterization data relevant to retrieved entity data, thereby forming relevant entity data to generate an entity or brand profile. Accessing a data model logic repository may implement an application configured to determine relevancy based on cosine similarity algorithms or vector similarity search ("VSS") algorithms to determine data representing relevant natural language units of text (e.g., labels, words, tokens, phrases, sentences, etc.).

At 2110, a profile characterization controller may be activated to generate a format customized to solicit or generate classes of profile characterization data. In some examples, a customized user interface may be generated (e.g., formatted with access to an LLM) as a function of relevant entity data. The user interface may be configured to accept other data to optimize data associated with classes of the profile characterization data. The other data may include data representing whether to integrate content data into data hosted by a distributed computing system (e.g., whether integration data or content data is aligned, in conflict, or neutral regarding placement of integration data in a distributed data source). The content data may be an electronic advertisement and a distributed data source or computing system may be a computing platform offering placements of an electronic advertisement. At 2112, data representing an entity profile including data 2050 to 2058 of FIG. 20 may be generated to be implemented as creative/integration data 2024.

Figure 22:
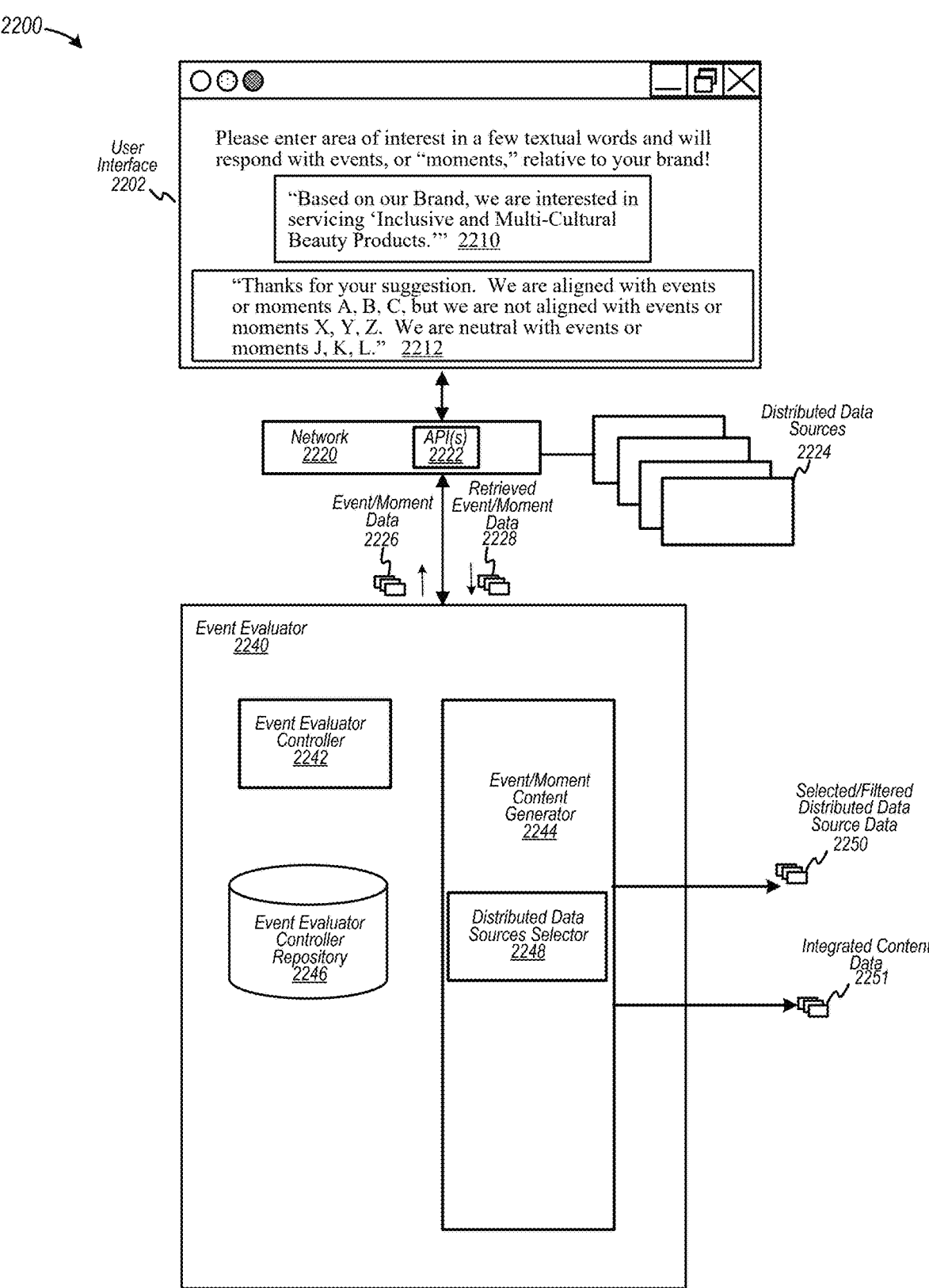
FIG. 22 is an illustration of an example of an event evaluator configured to identify event-related data to associate integration data with a distributed data source, according to some examples.

FIG. 22 is an illustration of an example of an event evaluator configured to identify event-related data to associate integration data with a distributed data source, according to some examples. Diagram 2200 includes an event evaluator 2240 including an event evaluator 2240, an event controller repository 2246, and an event/moment content generator 2244. Event evaluator 2240 may be configured to access via a network 2220 (and APIs 2222) a user interface 2202 to access data defining a good or service. In one example, user interface 2202 may be configured to receive data 2210 defining a targeted good or service associated with an industry vertical. Data 2210 may include a natural language input for which a brand owner may be interested (e.g., "inclusive" and "multi-cultural" goods or services) as a subset of search criteria associated with a good or service. Event evaluator 2240 may be configured to receive data 2210 and generate a portion of user interface 2202 in which a brand owner may refine generation of a brand profile as well as subsequent generation of integration data as, for example, advertisements. As shown, a brand owner may implement user interface 2022 that may be configured to provide data 2212 representing alignment with events or moments A, B, and C (e.g., favorable sporting events), or disassociate goods and products from events or moments X, Y, and Z (e.g., disfavorable political events). Or data 2212 describing a neutral or a "monitoring" position relative to an entity and its aims (e.g., monitoring neutral events or moments J, K, and L, among others).

In some examples, event evaluator controller 2242 including a processor and memory may include a large language model ("LLM") or any other machine learning or deep learning algorithm or data model, such as a neural network data model. As an example, event evaluator controller 2242 may be configured to determine or adjust a rate of diffusivity associated with event data that describes a rate of virality or propagation of electronic messages over any number of distributed data sources or social media computing platforms. Event evaluator controller 2242 may be configured to generate or access event/moment data 2232 associated with sources of event-related data based on a subset of search criteria. For example, event-related data may describe news-related events, political events, sporting events, social upheaval events, celebrity views or commentary, and other information that may affect adaptation of integrated data, such as an advertisement, into a distributed data source (e.g., a social media website). In some examples, event evaluator 2240 may be configured to generate moment data responsive to (or filtered by) persona data generated by persona data generator 1642 of FIG. 16 describing classifications of users as a target audience or group of consumers. Also, moment data may be generated to include data provided by entity profile characterizer 1644 that describes attributes of an entity. In some examples regarding FIG. 22, the term moment data may describe any related event-related data associated with a good or product, and may further describe a subset of related event-related data filtered as to whether an entity desires to associate itself with event-related data. For instance, an entity or brand may decline or encourage association with a particular opinion or scenario associated with a distributed social media data source. Or, an entity or brand may be determined to be neutral with which integration data may be neutrally associated and may be further monitored regarding activities associated with a distributed social media data source to identify whether it may be a suitable place in which to inject integration data (e.g., an electronic advertisement).

Event evaluator 2240 may be configured to generate search requests included data representing event/moment data 2226 to access retrieved event/moment data 2228 from distributed data sources 2224 to predict compatibility with a targeted distributed data source 2228 in which integration data may be digitally inserted or placed (e.g., as an advertisement).

As shown, event evaluator 2240 including event evaluator controller 2242 and event evaluator controller repository 2246 may be configured to predict or access filtering data as a function of personal classification data, brand profile data, and event-related data. Event/moment content generator 2244 may include a distributed data sources selector 2248 configured to analyze data regarding an entity, such as data entered into user interface 2202 as a prompt (e.g., to received data associated with terms "inclusive" and "multi-cultural" goods or services) to an LLM or any other deep learning or machine learning algorithm.

For example, distributed data selector 2248 may be configured to receive event/moment data 2228 defining which of brand information data, competitor data, influencer data, event data, social cause data, philanthropic data, opinion data, and scenario data that an entity is configured to lean into (e.g., align with a distributed data source), lean against (e.g., disengage from an alignment with a distributed data source), or may be neutral with placement of selected/filtered distributed data source data 2250 as integration data (e.g., an electronic advertisement) including integrated content data 2251. In some examples, distributed data sources selector 2248 may be configured to select a subset of social media computing platforms with which to inject integration data as, for example, a text-based and/or an image-based advertisement.

Distributed data selector 2248 may electronically interoperate with event evaluator controller 2240, whereby event evaluator controller 2240 may implement logic, such as an LLM, as a subset of classifiers to classify whether to agree, disagree, or remain neutral regarding distributed data sources based on the aforementioned data. In at least one instance, event evaluator 2240 may include logic configured to implement "anticipation software" and/or an anticipation board template application configured to receive one or more inputs, including inputs in natural language, to define a scope of relevant distributed data sources with which to apply integration data as a compatible advertisement. As an example, terms "inclusive" and "multi-cultural" relating to goods or services may be implemented as a prompt to a vector database in association with an LLM. In other cases, terms may be applied to an algorithm configured to implement vector similarity searching ("VSS") or natural language processing ("NLP") to identify relevant text, tokens, sentences, phrases, etc., any of which may be extracted from distributed data sources or social media platforms to determine a degree of compatibility with which to apply integration data as a targeted data file.

FIG. 23 is a diagram depicting an example of a flow to classify distributed data sources compatible with a good or service, according to some examples. Diagram 2300 depicts a flow at 2302 whereby a user interface may be generated with which to enter a natural language input describing a subset of search criteria of an entity associated with a good and service. A user interface may be configured to identify subsets of sources of event-related data that may be extracted at 2304 from distributed data sources, such as social media computing platforms, to identify news-related events, political events, sporting events, socially-related events, celebrity views or commentary, and other information constituting an environment in which to generate advertisement data.

At 2306, moment data associated with sources of event-related data may be accessed, whereby the moment data may be based a subset of search criteria (e.g., data entered via an anticipation board template application) to filter event-related data to match requirements of an entity, such as filtering event-related data as a prompt to identity distributed data sources that may be aligned with an entity or a brand of goods or services.

At 2308, data may be applied to one or more classifiers via a user interface to define moment data. One or more classifiers may be portions of deep learning neural networks or an LLM configured to classify whether event data aligns with objectives of the entity, or is neutral with objectives of the entity, or event data may be incongruent with the objectives (e.g., a mission statement) of an entity. Further, one or more classifiers may be implemented with a VSS algorithm or via a vector database associated with an LLM.

At 2310, a subset of the distributed data sources may be identified to which data representing content is to be integrated with hosted data files. For example, a subset of data may be identified as any of one or more sources of event-related associated with data at computing platforms hosting data representing temporal events associated with changes in data related to social media, webpages, texts, emails, and on-line data repositories. A first subset of sources of event-related data may be associated with news-related data and a second subset of sources of event-related data may be associated with industry-related data.

Figure 24:
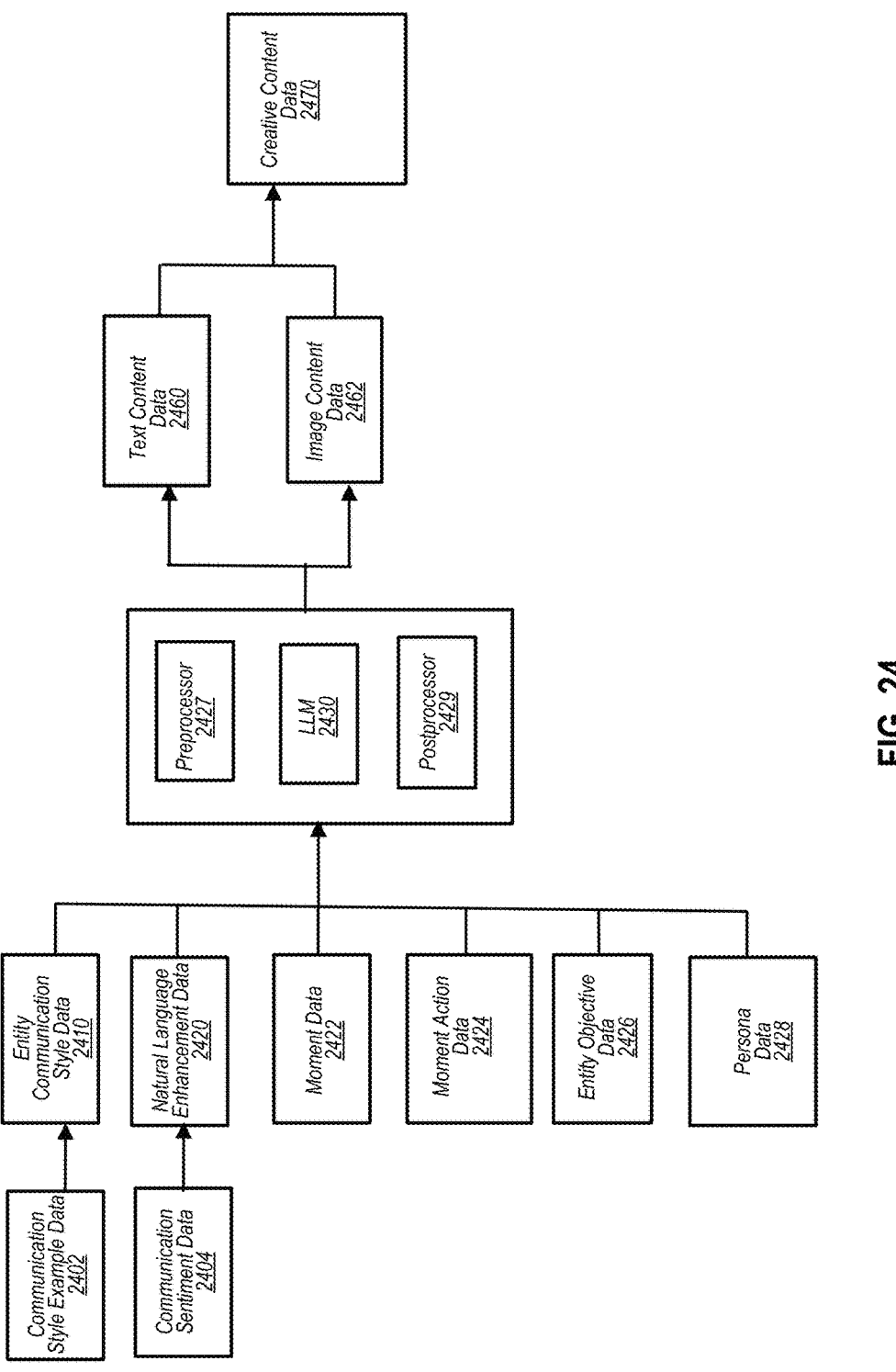
FIG. 24 is a diagram depicting an example of generating integration data as creative content data, according to some examples.

FIG. 24 is a diagram depicting an example of generating integration data as creative content data, according to some examples. Diagram 2400 depicts an LLM 2430 configured to receive inputs to generate integration data autonomously by using generative AI to generate text content data 2460 and/or image content data 2462 to form integration data as creative content data 2470, which may represent an advertisement that includes text and imagery (or video) automatically formed based on input data.

Input data may include communication style example data 2402 as, for example, natural language expressions used by an entity to describe goods or services of one or more brands. In some cases, communication style example data 2402 may be "scraped" from an existing website or a pool of data describing brand to form entity communication style data 2410, which may include logic to adapt text or images based on a brand targeting "professional software developers" or "fans of a celebrity." As such, entity communication style data 2410 may be configured to convey or adapt text generation in accordance with a writing style based on data representing an entity or a brand. Communication sentiment data 2404 may include data representing natural language expressing a sentiment or writing style characteristics to adapt integration data based on targeted audience characteristics, such as an education level, whether generated text ought to be formal (or informal, using emojis and abbreviations, like 'LOL'), whether generated text ought to be serious or humorous, whether generated text ought to be motivational, whether generated text may be "edgy" or somewhat using trending slang language, or other sentiment or writing style characteristics. Communication sentiment data 2404 may be configured to form natural language enhancement data 2420, which, may in some examples express generated text having a "tone of voice."

Input data may also include moment data 2422 describing event-related data that may be filtered in accordance whether creative content data 2470 ought to be generated based on an entity's or a brand's preference whether to align or not align with a targeted distributed data source or social media computing platform as described in moment action data 2424. Moment action data 2424 may include data relating to brand profile data based on queries, opinions, scenarios, etc., as described above. Entity objective data 2426 may include data describing a mission statement, a values statement, and a vision statement, for example, in natural language whether extracted from a website or generated autonomously by generative AI logic. Optionally, persona classification data 2428 may be applied as input data.

Preprocessor 2427 may be configured to preprocess the input data for application, for example, to a vector database. Preprocessor 2427 may be configured to generate vector embeddings based on the input data. LLM 2430 may be configured to receive data from a vector database to generate integration data or advertisement data autonomously. Postprocessor 2429 may be implemented to conform formation of text content data 2460 and image content data 2452 in accordance with proprietary rules defined by an entity, such as formatting integration for inclusion a specific type of social media computing platform, such as Twitter™ or X™, Facebook®, LinkedIn™, Instagram™, YouTube®, and the like. As an example, LLM 2430 may be configured to generate data constituting a text-based and/or image-based advertisement for distribution in any compatible social media platform based on persona classification data, brand profile data, and event-related data (or moment data).

FIG. 25 is a diagram depicting an example of a flow to generate integration data promoting a good or a service compatible with distributed data sources, according to some examples. Diagram 2500 depicts a flow that at 2502 data representing an alphanumeric format may be generated to form a text-based electronic message in natural language in accordance with attributes of an entity or a brand from text-based data, such as text content data 2460 of FIG. 24. Referring back to FIG. 25, at 2504 event data or moment data may be received or derived from distributed data sources to derive a context with which to generate an electronic message including a text-based electronic message constituting integration data (e.g., an electronic advertisement).

At 2506, entity objective data, such as mission values-related, may be accessed and configured to adapt an electronic message including integration data in accordance with the entity objective data. In some examples, accessing data may include generating text-based data in accordance with a writing style and/or a tone of voice associated with an entity as an alphanumeric format. At 2508, data representing an alphanumeric format and entity objective data may be applied to a large language model ("LLM") at a computing platform including a processor and memory. In some cases, persona classification data may be applied to an LLM to generate creative content data. At 2510, content based on an output of an LLM may be derived to generate text content data 2460 and/or image content data 2462 of FIG. 24.

Referring back to FIG. 25, at 2512 image data may be correlated with an output of the large language model to generate an electronic message to form image data to incorporate into an electronic message representing integration data, such as an autonomously-generated advertisement compatible with targeted distributed data sources. In some examples, an LLM may generate image data as a function of text-based data. At 2514, integration data including creative content data may be automatically and autonomously generated to conform to a compatible targeted distributed data source (e.g., a social media computing platform) including data automatically generated as an advertisement as computer-generated image data and text data.

Various approaches may implement machine learning neural networks, deep learning neural networks, artificial neural networks, convolution neural networks, recursive neural networks ("RNN"), long short-term memory ("LSTM"), and the like, and any of which may implement natural language processing ("NLP") and/or natural language model. Further, various examples described herein may implement generative artificial intelligence with natural language, generative pre-trained transformers ("GPT")™, large language models ("LLM"), and the like. Also, agent programs that accept and transmits data in natural language, such as a natural language chatbot, may be used to interoperate with the above-described approaches, including ChatGPT™ of OpenAI™ of San Francisco, CA, as well as others.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving data inputs into a computing platform including a processor and memory that stores at least a portion of executable instructions to generate persona classification data;
applying a subset of the data inputs into a context data generator, the subset of the data inputs includes entity data, entity communication link data, and entity profile data;
generating persona characterization data to include descriptive data or image data, or both;
applying the persona characterization data to a vector database;
generating targeting parameters based on data representing distributed computing platforms configured to host distributed files;
applying the targeting parameters to a first large language model ("LLM") to identify distributed computing platform-specific segments as a function of persona characterization data;
embedding into a vector database data the descriptive data or image data as vectors to form vectorized data;
generating at the large language model an output configured to automatically modify operation of a brand profile generator using the vectorized data;
deriving content based on the output including an event composite value;
generating automatically integration data to include the image data and text-based data to integrate with at least one of the distributed computing platforms; and
causing creative content to align with a targeted distribution source including a social media computing platform.

2. The method of claim 1 wherein the entity data, the entity communication link data, and the entity profile data further include a name of a good or a service as a brand name, a web page link, and brand profile data.

3. The method of claim 1 wherein generating the persona characterization data to include the descriptive data or the image data, or both, further comprises:
applying the persona characterization data to a persona generator.

4. The method of claim 3 wherein applying the persona characterization data to the persona generator further comprises:
apply the persona characterization data as one or more prompts to a second large language model ("LLM").

5. The method of claim 4 wherein the first LLM and the second LLM are the same.

6. The method of claim 1 wherein generating the persona characterization data to include the image data further comprises:
analyzing multiple sources of image data from the data representing the distributed computing platforms configured to host the distributed files to extract persona-related data from the multiple sources of image data.

7. The method of claim 1 wherein generating the persona characterization data to include the image data further comprises:
applying the image data to a computer vision application.

8. The method of claim 1 wherein the first large language model ("LLM") is configured to implement retrieval-augmented generation ("RAG").

9. A system comprising:
a data store configured to receive streams of data via a network into an application computing platform; and

a processor configured to execute instructions to implement an application configured to:

receive data inputs into a computing platform including a processor and memory that stores at least a portion of executable instructions to generate persona classification data;

apply a subset of the data inputs into a context data generator, the subset of the data inputs includes entity data, entity communication link data, and entity profile data;

generate persona characterization data to include descriptive data or image data, or both;

apply the persona characterization data to a vector database;

generate targeting parameters based on data representing distributed computing platforms configured to host distributed files;

apply the targeting parameters to a first large language model ("LLM") to identify distributed computing platform-specific segments as a function of persona characterization data;

embed into a vector database data the descriptive data or image data as vectors to form vectorized data;

generate at the large language model an output configured to automatically modify operation of a brand profile generator using the vectorized data;

derive content based on the output including an event composite value;

generate automatically integration data to include the image data and text-based data to integrate with at least one of the distributed computing platforms; and cause creative content to align with a targeted distribution source including a social media computing platform.

10. The system of claim 9 wherein the entity data, the entity communication link data, and the entity profile data further include a name of a good or a service as a brand name, a web page link, and brand profile data.

11. The system of claim 9 wherein the processor configured to generate the persona characterization data to include the descriptive data or the image data, or both, is further configured to:

apply the persona characterization data to a persona generator.

12. The system of claim 11 wherein the processor configured to apply the persona characterization data to the persona generator is further configured to:

apply the persona characterization data as one or more prompts to a second large language model ("LLM").

13. The system of claim 12 wherein the first LLM and the second LLM are the same.

14. The system of claim 9 wherein the processor configured to generate the persona characterization data to include the image data is further configured to:

analyze multiple sources of image data from the data representing the distributed computing platforms configured to host the distributed files to extract persona-related data from the multiple sources of image data.

15. The system of claim 9 wherein the processor configured to generate the persona characterization data to include the image data is further configured to:

apply the image data to a computer vision application.

16. The method of claim 9 wherein the first large language model ("LLM") is configured to implement retrieval-augmented generation ("RAG").

17. A non-transitory computer readable medium having one or more computer program instructions configured to perform a method, the method comprising:

receiving data inputs into a computing platform including a processor and memory that stores at least a portion of executable instructions to generate persona classification data;

applying a subset of the data inputs into a context data generator, the subset of the data inputs includes entity data, entity communication link data, and entity profile data;

generating persona characterization data to include descriptive data or image data, or both;

applying the persona characterization data to a vector database;

generating targeting parameters based on data representing distributed computing platforms configured to host distributed files;

applying the targeting parameters to a first large language model ("LLM") to identify distributed computing platform-specific segments as a function of persona characterization data;

embedding into a vector database data the descriptive data or image data as vectors to form vectorized data;

generating at the large language model an output configured to automatically modify operation of a brand profile generator using the vectorized data;

deriving content based on the output including an event composite value;

generating automatically integration data to include the image data and text-based data to integrate with at least one of the distributed computing platforms; and causing creative content to align with a targeted distribution source including a social media computing platform.

18. The method of claim 17 further comprising:
applying the persona characterization data to a persona generator.

* * * * *